US 6,748,215 B1

United States Patent
Chen et al.

(10) Patent No.: US 6,748,215 B1
(45) Date of Patent: Jun. 8, 2004

(54) METHOD AND APPARATUS FOR PERFORMING A CANDIDATE FREQUENCY SEARCH IN A WIRELESS COMMUNICATION SYSTEM

(75) Inventors: Qingxin Chen, Del Mar, CA (US); Baaziz Achour, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 283 days.

(21) Appl. No.: 09/677,039

(22) Filed: Sep. 29, 2000

(51) Int. Cl.$^7$ ................................................ H04Q 7/20
(52) U.S. Cl. ........................ 455/434; 455/436; 455/515; 455/67.1
(58) Field of Search ................................ 455/434, 436, 455/67.1, 515

(56) References Cited

U.S. PATENT DOCUMENTS 6,069,880 A  *  5/2000  Owen et al. ................. 370/311
6,246,673 B1 *  6/2001  Tiedemann et al. ......... 370/333
6,421,373 B1 *  7/2002  Saito ............................ 375/148

FOREIGN PATENT DOCUMENTS

WO    WO 9729611   *  8/1997
WO    WO 9941934   *  8/1999

OTHER PUBLICATIONS

Satarsinghe, P: "A novel method for CDMA hard handoff", Globecom 1996, London, Nov. 18, 1996. IEEE, vol. 3, Nov. 18, 1996, pp. 1766–1768.*

* cited by examiner

Primary Examiner—Nay Maung
Assistant Examiner—Sujatha Sharma
(74) Attorney, Agent, or Firm—Philip R. Wadsworth; Charles D. Brown; Nicholas J. Pauley

(57) ABSTRACT

A method and apparatus for decreasing the probability of dropping a call during a hard handoff procedure in a wireless communication system. The two primary functions of the candidate frequency (CF) search method and apparatus of the present invention are to detect the strong pilots on a candidate frequency in the area of the mobile station and to maintain adequate service quality during the CF search.

2 Claims, 17 Drawing Sheets

STAGE ONE -
SCHEDULING TECHNIQUE

STAGE TWO -
SEARCH PROCEDURE

METHOD AND APPARATUS FOR PERFORMING A CANDIDATE FREQUENCY SEARCH IN A WIRELESS COMMUNICATION SYSTEM

BACKGROUND OF THE INVENTION

1. Field of the Invention

This invention relates to digital wireless communication systems, and more particularly to methods for efficiently performing candidate frequency searches in digital wireless communications systems.

2. Description of Related Art

Wireless communication systems facilitate two-way communication between a plurality of subscriber mobile radio stations or "mobile stations" and a fixed network infrastructure. Typically, the mobile stations communicate with the fixed network infrastructure via a plurality of fixed base stations. Exemplary systems include such mobile cellular telephone systems as Time Division Multiple Access (TDMA) systems, Code Division Multiple Access (CDMA) systems, and Frequency Division Multiple Access (FDMA) systems. The objective of these digital wireless communication systems is to provide communication channels on demand between the mobile stations and the base stations in order to connect the mobile station users with the fixed network infrastructure (usually a wired-line system).

Basic CDMA Communication System

Mobile stations typically communicate with base stations using a duplexing scheme that allows for the exchange of information in both directions of connection. In most existing communication systems, transmissions from a base station to a mobile station are referred to as "forward link" transmissions. Transmissions from a mobile station to a base station are referred to as "reverse link" transmissions. These CDMA systems are well-known in the art. For example, some such system is described in U.S. Pat. No. 4,901,307, issued on Feb. 13, 1990 to Gilhousen et al. and assigned to the owner of the present invention, which is also hereby incorporated by reference for its teachings of CDMA communication systems. Basic radio system parameters and call processing procedures for exemplary prior art CDMA systems is described in the TIA specification, entitled "Mobile Station-Base Station Compatibility Standard for Dual-Mode Wideband Spread Spectrum Cellular System," TIA/EIA/IS-95-A, published in May 1995 by the Telecommunications Industry Association, and referred to hereafter as "IS-95A". The update and revision to IS-95A and J-STD-008 (PCS specification analogous to IS-95A) is TIA/EIAJIS-95-B, published in Mar. 1999 by the Telecommunications Industry Association, and referred to hereafter as "IS-95B". Both the IS-95A and IS-95B specifications are hereby incorporated by reference for their teachings on CDMA communication systems.

As shown in FIG. 1, a typical CDMA communication system comprises at least one mobile station and a plurality of fixed base stations geographically distributed over the system's service area and controlled by a mobile telecommunications switching office (MTSO) 20. The service area is defined as the geographical area within which a mobile station can remain and yet still communicate (i.e., maintain a valid radio link) with the CDMA communication system. Each base station provides communication services to a fixed area within the service area. The service area is known as the base station's "coverage area". Thus, when a mobile station is within a base station's coverage area the base station is able to provide communication services to the mobile station. A base station that provides service to the mobile is also known as a "serving" base station. The MTSO 20 coordinates all of the switching functions between base stations, mobile stations, and other communications systems (e.g., a Public Service Telephone Network or satellite communication system).

Communication between a base station and a mobile station is established by a negotiation process that is initiated upon call origination. The serving base station begins the negotiation process by assigning a selected one of its available forward traffic channels to the mobile station and thus establishes a forward link with the mobile station. The mobile station then establishes a reverse link with the serving base station. Base stations continuously transmit pilot channels. Mobile stations track base station signals through acquiring and tracking pilot channels. Once communication is established between the serving base station and the mobile station, pilot channels emitted by each base station are used by the mobile station to determine the base station coverage area that the mobile station is within and the quality of the link to the base station. As described in more detail below, these pilot channels aid in a procedure known as a "handoff" procedure. One such method of a handoff procedure is described in U.S. Pat. No. 5,848,063, issued on Dec. 8, 1998 to Weaver et al., assigned to the owner of the present invention, which is also hereby incorporated by reference for its teachings on CDMA communication systems, especially with respect to its teachings on handoff procedures.

A handoff occurs when a mobile station moves across a "boundary line" from a first serving base station's coverage area to a second base station's coverage area. The communication system "hands over" service from the first serving base station to the second base station, also known as the "target" base station. A handoff also occurs when a single base station utilizes multiple frequency channels and switches communication between frequency channels. Each pilot channel is identified by a pseudorandom noise (PN) sequence offset and a frequency assignment. Thus, each pilot channel is uniquely identified with a base station that transmits the pilot channel. Pilot channels aid mobile stations in performing candidate frequency searches.

A candidate frequency (CF) search is a process by which a mobile station searches for pilot channels on a frequency other than the serving frequency. A CF search is performed to assist the base station in determining if handing off to a different frequency is necessary. Thus, CF searches apply to a handoff between (i.e., a hard handoff). The pilot CF search measures received input powers and signal strengths of pilots. These measurements help determine the base station coverage area on CF's that the mobile station is within and the quality of the link to the base station. When the mobile station detects a pilot channel of significant strength (i.e., the mobile station is at or very near the frequency coverage boundary of the serving base station or a different base station), it reports the pilot channel to a base station controller. The base station controller initiates a handoff procedure to switch to a target base station (the base station associated with the pilot channel) where the mobile station active set now contains the new pilot channel. The mobile station active set is defined as a set of base stations in communication with the mobile station. Then, as described below, the MTSO 20 switches the radio link from the serving base station to the target base station.

FIG. 1 depicts a simple CDMA communication system having a service area comprising seven base stations controlled by one MTSO 20. Each base station services a separate coverage area, represented by a hexagon in FIG. 1, and communicates with a specific frequency, frequency one ($F_1$) or frequency two ($F_2$). Typically, F1 and $F_2$ operate either on the Cellular band (800 MHz) or the PCS band (1900 MHz). For example, a first base station 12, located in the middle of a Service Coverage Area One, communicates on a first frequency $F_1$. A mobile station 10 is serviced by the first base station 12 because it is located within the Coverage Area One. When the mobile station 10 moves from the Coverage Area One to a Coverage Area Two, it performs a handoff procedure from the first base station 12, the serving base station, to a second base station 14, the target base station. Thus, the mobile station 10' (of FIG. 1) is now serviced by the second base station 14. It is critical for the MTSO to determine the appropriate time to initiate a handoff to a different frequency than the serving frequency in order to maintain communication with the mobile station during a call.

In CDMA systems, there are two basic types of handoffs, so-called "hard handoffs" and "soft handoffs". A "soft handoff" is a handoff procedure in which the mobile station commences communications with a target base station without interrupting communications with the serving base station. Because mobile stations typically contain only one radio soft handoffs can only be used between base stations with CDMA Channels having identical frequency assignments. Referring to FIG. 1, a soft handoff procedure is performed when the mobile station 10 travels from a first Coverage Area One to a third Coverage Area Three because the base station 12 and a third base station 16 have identical frequency assignments, $F_1$.

Hard Handoff

A "hard handoff" is defined as a handoff in which a mobile station commences communication with a target base station after a momentary interruption in communication with a serving base station. A hard handoff is used when the serving base stations and the target base stations have differing CDMA channel frequency assignments. A hard handoff can also occur when a single base station utilizes multiple frequency channels and switches communication between frequency channels. The present invention is concerned with the multiple base station scenario, and thus, the single base station scenario is not discussed in detail herein. During a hard handoff, the radio link is momentarily interrupted because a typical mobile station contains only one radio and therefore can only demodulate one frequency at a time. Thus, switching from the CDMA channels of the serving base station frequency to the CDMA channels of the target base station frequency produces a momentary interruption in the continuity of the radio link with the CDMA communication system. As shown in FIG. 1, the first base station 12 is assigned a first frequency $F_1$ and the second base station 14 is assigned a second frequency $F_2$. A hard handoff is performed when the mobile station 10 travels from Coverage Area One to the Coverage Area Two because the first base station 12 and the second base station 14 operate on different frequencies, $F_1$ and $F_2$, as shown in FIG. 1.

FIGS. 2a–2c depict an ideal hard handoff procedure between geographically adjacent base stations. The adjacent base stations, base station one 12 and base station two 14, are assigned different frequency assignments, respectively, $F_1$ and $F_2$. As shown in FIG. 2a, communication between the base station one 12 and the mobile station 10 is established on a serving frequency (SF) 32. The serving frequency is a CDMA channel that operates on $F_1$. The mobile station 10 performs a Candidate Frequency (CF) search for pilot channels either periodically or when requested from a base station. During the CF search the mobile station 10 determines the respective strengths of the pilot channels. The mobile station 10 detects a candidate frequency 34 corresponding to the base station two 14 which transmits on frequency $F_2$ and its associated pilot channel 40 which also transmits on the frequency $F_2$. When the strength of the pilot channel 40 is deemed to be sufficient, the mobile station 10 reports the pilot strength to the base station one 12. The base station one 12 initiates a hard handoff procedure if certain (base station proprietary) conditions are satisfied.

As shown in FIG. 2b, the mobile station 10 momentarily loses communication with the base station one 12 as it acquires the base station two 14 because the mobile station 10 is typically capable of demodulating only one frequency at a time. As shown in FIG. 2c, the mobile station 10 then communicates with the base station two 14 on a new serving frequency 38 (formerly known as the candidate frequency 34). The serving frequency 38 operates on the CDMA channel $F_2$. Thus, the mobile station 10 has been switched from communicating with the base station one 12 on the old serving frequency 32 (FIG. 2a) which operates on CDMA channel $F_1$, to communicating with the base station two 14 on the new serving frequency 38, which operates on the CDMA channel $F_2$.

Disadvantageously, a hard handoff procedure results in an increased probability of dropping a call (i.e., losing a call) than a soft handoff procedure because of the difficulty of controlling the timing of the handoff when switching from the serving base station to the target base station. A complete loss of communication results when the base station initiates a hard handoff too early based on mobile station reported measurements (i.e., before the mobile station 10 is near the base station boundary line 24 (FIGS. 2a–2c)). Referring to FIG. 2b, assume for a moment that the base station 12 initiates a handoff (from BS 12 to BS 14) with the mobile station 10' prematurely. As shown in FIG. 2d, the mobile station 10 would thereby suffer a complete loss of communication after the base station 12 initiated such a premature hard handoff attempt.

An important objective of CDMA communications is to reduce the probability of dropping a call during a hard handoff procedure. As the communication system increases its accuracy of detecting the coverage boundaries between base stations, the probability of dropping a call is reduced. Thus, industry technical specifications (e.g., IS-95B) and prior art methods have been developed to increase the accuracy determining the best possible instant to initiate mobile station hard handoffs.

Candidate Frequency Search as defined in IS-95B

IS-95B requires the mobile station to perform a "Candidate Frequency Search" (CF Search) to assist the base station in the hard handoff processes. A Candidate Frequency (CF) is defined as a frequency that is transmitted by a base station that is a member of the CDMA communication system and that is not the serving frequency. Each CF contains an associated set of pilot channels. The CF Search allows base stations to more accurately determine when the mobile station is within good coverage of a particular base station, on a given frequency. This increased accuracy in determining the quality of a signal that the mobile station receives from a particular base station aids the communication system in performing hard handoff procedures.

In accordance with the IS-95B specification, at the initiation of an IS-95B CF Search, the base station sends a "Candidate Frequency Search Set" (CF Search Set) to the selected mobile station. The CF Search Set comprises a set of pilot PN offsets on the Candidate Frequency that the base station instructs the mobile station to search. During a CF Search the mobile station momentarily disconnects from its radio link on the Serving Frequency (SF). Thus, communication with the serving base station is momentarily interrupted. After the mobile station disconnects from the SF, it tunes to the CF and measures the received input power and the signal strengths of the pilot channels specified in the CF Search Set. During a final step of the CF Search, the mobile station tunes back to the SF (i.e., the serving base station) and reports the pilot channels that have received signal strengths exceeding a pre-defined threshold.

The IS-95B standard has defined two types of CF searches, Candidate Frequency Single Search and Candidate Frequency Periodic Search. The CF Single Search occurs when the mobile station is instructed to perform only one search of the CF Search Set. A single search can be performed during one or more visits to the CF. The CF Periodic Search occurs when the mobile station is instructed to perform searches of the CF Search Set at a cyclic period specified by the base station. Thus, the CF Periodic Search can be thought of as a set of multiple CF Single Searches performed at specific cyclic periods. Details of an IS-95B CF Single Search call flow are given below in Table 1.
Example of an IS-95B CDMA Candidate Frequency Single Search During a Typical Call mobile station on the forward traffic channel. These parameters include the CF Search Set. The "Freshness_Interval" is defined as the total time period that the base station will allow the mobile station to search for pilot channels before reporting back to the base station. The mobile station then transmits a message back to the base station reporting its search capabilities. After assessing the mobile station's search capabilities the base station requests a CF Single Search. A CF Single Search may consist of multiple visits by the mobile station to the CF.

Referring to Table 1, the Single Search Procedure begins with the mobile station storing the Serving Frequency parameters in order to return to the SF after tuning to the Candidate Frequencies. The mobile station discontinues operation on the SF and thus interrupts communications on its radio link (i.e., reverse link) with the base station. The base station's radio link (i.e., forward channel) is similarly interrupted (i.e., the base station transmits a signal, but the mobile station does not receive the signal). Therefore, until the mobile station re-tunes back to the SF the call will be interrupted. The mobile station can schedule CF Single Search in multiple visits to the CF so that an interruption is not perceptible to a user. A user may or may not perceive an interruption depending upon the duration of the interruption. Typically, a user will not perceive an interruption of less than 60 milliseconds. After the mobile station discontinues opera-

TABLE 1

IS-95B Candidate Frequency Search Call Flow Example

| Mobile Station (MS) | | | | Base Station (BS) |
|---|---|---|---|---|
| • Forward link and Reverse link already established between mobile station and serving base station | > < | Reverse Traffic Channel Forward Traffic Channel | > < | • Forward link and Reverse link already established between mobile station and serving base station |
| | < | Forward Traffic Channel | < | • Sends CF Search parameters including Candidate Frequency (CF) Search Set |
| • Responds with its search capabilities | > | Reverse Traffic Channel | > | |
| •Performs Single Visit Procedures as follows: | < | Forward Traffic Channel | < | • Requests a Single Search |
| • Stores Serving Frequency (SF) parameters | | | | |
| • Discontinues operation on SF | | | | • Radio link with MS interrupted |
| •Tunes to CF and measures input power | | | | • Radio link with MS interrupted |
| • May abort visit if the difference between SF input power and CF input power is less than a predetermined threshold | | | | • Radio link with MS interrupted |
| • Measures Ec/Io (signal strength) for all or some of the pilots in the CF search set | | | | • Radio link with MS interrupted |
| • Tunes to SF and restores SF parameters | | | | • Radio link with MS regained |
| • Repeats Single Visit Procedures, if necessary, until all pilots in the CF Search Set are measured | | | | |
| • Sends report of all data within the Freshness Interval time period | > | Reverse Traffic Channel | > | • Receives pilot measurement data and decides whether to initiate a hard handoff |

Table 1 shows the functional requirements of a Candidate Frequency Single Search as defined in IS-95B. In this example, a call is already in progress, thus, a forward link and a reverse link are already established between the mobile station (MS) and the base station (BS). As shown in Table I, the base station sends CF search parameters to the tion on the SF it tunes to the Candidate Frequency. After the tuning to the CF, the mobile station measures the input power of the CF. If the CF input power is relatively low compared to the SF input power, then the mobile station may abort tuning to the CF. If the mobile station continues the search on the CF, it measures the Ec/Io (i.e., the signal strength) for all or some of the pilots in the CF Search Set. The mobile station tunes back to the SF and restores the SF parameters in order to continue the call. The mobile station repeats the visit to the CF at an MS scheduled interval until all pilots in the CF search set have been measured. The mobile station then sends a report of only the pilot data measurements above a predetermined threshold to the base station. Finally, the base station decides whether to initiate a hard handoff based on the received pilot signal strengths.

One disadvantage of the IS-95B CF Search technique is the degradation of voice quality due to the interruption of the radio link with the base station during the CF tuning. Normally, a user does not perceive this interruption because of its short duration (e.g., 60 milliseconds). However, an increase in the number of pilot channels in the CF Search Set causes the MS to interrupt its radio link with the serving base station for longer periods. Degradation in voice quality thereby occurs. In dense service areas a relatively large number of pilot channels need to be searched. Thus, it is desirable to increase the number of pilot measurements taken during CF Searches while reducing interference to and degradation of voice quality.

Prior Art—Frequency Beacon Method

One prior art attempt at solving the hard handoff call degradation problems uses frequency beacons. This prior art attempt adds a frequency beacon to a base station operating on a different frequency from an adjacent base station. The prior art frequency beacon only transmits pilot signals. For example, referring again to FIG. 1, the base station two 14 operates on the CDMA channel $F_2$ and the adjacent base station one 12 operates on the CDMA channel $F_1$. The prior art attempts include a frequency beacon with the base station two 14. The base station two 14 transmits a beacon channel on CDMA channel $F_1$.

An exemplary prior art system that uses base station beacons is shown as if operating under ideal conditions in FIGS. 3a–3c. As shown in FIG. 3a, the base station two 14 has a frequency beacon 18. The base station two 14 transmits a beacon channel 36 that operates on a CDMA channel $F_1$. The base station two 14 operates its communication channels on a frequency $F_2$, while the adjacent base station 12 operates its communication channels on a frequency $F_1$. As shown in FIG. 3a, the base station one 12 and the mobile station 10 establish forward and reverse links on a serving frequency 32. The serving frequency 32 operates on CDMA channel $F_1$. Upon detection of the beacon channel 36 transmitted by the frequency beacon 18, the communication system detects that the mobile station 10 is near the base station two 14. Under ideal conditions, this detection occurs without the mobile station 10 breaking its radio link with the base station one 12. The radio link is continuous because both the beacon channel 36 and the serving frequency 32 operate on $F^1$. When the strength of the beacon channel 36 is sufficient, the base station one 12 initiates a hard handoff procedure for the mobile station 10.

As shown in FIG. 3b, during a hard handoff procedure, the mobile station 10 momentarily loses communication with both the base station one 12 and the base station two 14 because the mobile station 10 is capable of demodulating only one frequency at a time. As shown in FIG. 3c, after the hard handoff, the mobile station 10 communicates with the base station two 14 on a new serving frequency 38 that operates on the CDMA channel $F_2$. Thus, after the hard handoffs, the mobile station 10 is switched from communicating with the base station one 12 on the old SF 32 (that operates on CDMA channel $F_1$) to communicating with the base station two 14 on the new SF 38 (that operates on CDMA channel $F_2$). Under the ideal conditions depicted the mobile station 10 interrupts radio link communication with the communication system for only a few milliseconds. This relatively small amount of time allows the base station two 14 and the mobile station 10 to establish a radio link without dropping the call. However, in the real world environment, conditions are seldom ideal.

Disadvantageously, when operating under non-ideal conditions as exist in typical mobile system environments, the frequency prior art beacon methods occasionally drops calls. Under typical operating environments base station coverage boundary lines are often very complex. Operating environments such as road configuration, direction of travel, and propagation interference from buildings, mountains, and the like cause base station boundaries to be difficult to identify. Due to these complex base station boundaries, mobile stations can report a good strength of a frequency beacon, but by the time the base station initiates a hard handoff, the mobile station is no longer in good coverage conditions. Disadvantageously, this error results in dropped calls.

The prior art beacon methods described above as operating under ideal conditions is shown in FIGS. 4a–4c as operating under typical real-world conditions. As shown in FIG. 4a, the base station boundary line 24 is very complex due to real world operating conditions. The base station two 14 uses the frequency beacon prior art method described above in reference to FIGS. 3a–3c. As described above, the base station one 12 and the mobile station 10 establish forward and reverse links on a serving frequency 32 that transmit on CDMA channel $F^1$. Upon detection of the beacon channel 36, the communication system determines that the mobile station 10 is near the base station two 14. The system makes this determination without breaking the radio link with the base station one 12. The radio link is maintained because both the beacon channel 36 and the serving frequency 32 operate on the same CDMA frequency channel $F_1$. When the beacon channel 36 is sufficiently strong, the mobile station 10 reports the pilot strength to the base station which initiates a hard handoff procedure.

As shown in FIG. 4b, the mobile station 10 nears the base station boundary line 24, however, because the boundary line 24 is complex in real world environments, the mobile station 20 does not enter base station two's 14 coverage area. The mobile station 10 therefore completely loses communication with both the base station one 12 and the base station two 14 due to the hard handoff procedure. As shown in FIG. 4c, the mobile station 10 remains within the coverage area of base station one 12, however the call remains dropped due to the erroneous hard handoff procedure.

Another disadvantage of the prior art frequency beacon methods is the increased costs associated with the necessity of equipping multiple base stations with frequency beacons. The prior art requires additional hardware in order to operate a frequency beacon at each base station. Normally, a CDMA communication system services a large geographical area (e.g., San Diego County) which may require one hundred or more base stations. In such a system, most of the base stations would require a frequency beacon because it is highly likely that a given base station will adjoin at least one other base station that operates on a different frequency. Thus, the cost of equipping all of these base stations with frequency beacons can become prohibitive.

Yet another disadvantage of the prior art attempts is the degradation of voice quality in the mobile station caused by the use of multiple frequency beacons. A frequency beacon increases interference in the communication system because it transmits on the same frequency as the serving frequency.

This increased interference is exacerbated as the mobile station approaches the boundary line between adjacent base stations. The increased interference results in poor voice quality in the mobile station.

Still another disadvantage of the prior art attempts is non-compliance with IS-95B that requires that a CF Search be performed before performing a hard handoff. As stated above, the IS-95B CF Search requires a momentary loss of the radio link. This momentary loss can result in a degradation of voice quality. Thus, it is desirable to increase the number of pilots measured during a CF Search while reducing interference to voice quality. It is also desirable to initiate a hard handoff procedure with a reduction in the probability of dropping calls. It is desirable to perform such a CF search technique without increasing either the cost or adversely affecting the capacity of the communication system. The present invention provides such a method and apparatus that addresses these needs by providing a CF Search with a strategy for visiting pilot channels which increases the number of pilots measured while reducing voice quality degradation. The present invention also provides a mechanism for determining the strongest pilot channel that is available.

SUMMARY OF THE INVENTION

The present invention is a novel method and apparatus for performing candidate frequency searches in a digital wireless communication system. The present invention performs this candidate frequency search without noticeably degrading voice quality. The two primary functions of the candidate frequency (CF) search method and apparatus of the present invention are: (1) to detect the strongest pilot channel on the candidate frequency in the area of the mobile station; and (2) to maintain adequate voice quality during the CF search. The present candidate frequency search method and apparatus preferably achieves these two primary functions using a two-stage process.

A "Stage One Scheduling" Technique preferably determines the best strategy for visiting candidate frequencies. Once the best strategy is determined, the Stage One information is passed to a "Stage Two Search" Procedure. The Stage Two Search Procedure uses this information in visiting candidate frequencies. During Stage Two, search parameters are processed and the information gathered is used in visiting candidate frequencies. Pilot channels on the candidate frequency having relatively high strengths are noted by the system for possible use in performing a handoff procedure.

The present invention reduces the chance of losing or dropping a call through a novel method of detecting candidate frequency pilots. The present invention aids a mobile station in detecting the strong CF pilots in two stages: (1) a schedule for the best strategy to visit pilot channels is determined; and (2) a search procedure to determine the strong pilot channel is implemented. These two stages of the present invention allow an MS to detect the strong CF pilots and maintain adequate voice quality during the CF Search.

The Stage One Scheduling Technique of the present invention determines the best strategy for a mobile station (MS) to visit the Candidate Frequency while reducing the interruption to the forward link. In an exemplary embodiment of the present invention, the best strategy to visit Candidate Frequencies is represented by the data values Tv, Nmpv, and Nv that are output to the Stage Two Search Procedures for visiting candidate frequencies. Tv is defined as the period of successive visits to the candidate frequency. Nmpv is defined as the number of measurements per visit. Nv is defined as the number of visits during the Freshness_ Interval (defined above). The data values, Tv, Nmpv, and Nv are calculated from the mobile station's search capabilities, the pilot measurement accuracy requirements, and the voice quality optimization requirements.

In the exemplary embodiment of the Stage One Scheduling Technique, the base station exchanges parameter information with the mobile station. These parameters are received in the form of data messages in accordance with IS-95B. The mobile station uses the parameter information to determine the best schedule for a candidate frequency search.

In an alternative embodiment of the Stage One Scheduling Technique, the mobile station determines the parameter information. In accordance with this alternative embodiment, the mobile station does not interact with the base station during the Stage One Scheduling Technique.

In yet another alternative embodiment, the base station performs the Stage One Scheduling Technique without interacting with the mobile station. In accordance with this alternative embodiment, the base station calculates the Stage One Scheduling Technique output values for Tv, Nmpv, Nv. Then, the base station provides this information to the mobile station for the Stage Two Scheduling Technique.

The two stages of the present invention cooperate to aid any wireless communication system in performing a hard handoff. The present invention does so without noticeably degrading voice quality.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The method and apparatus of the present invention decreases the probability of degrading and dropping a call during a hard handoff. The present invention achieves this decrease without noticeably degrading voice quality. The primary function of the candidate frequency search method and apparatus of the present invention is to measure all of the pilots in a CF Search Set while maintaining adequate voice quality during the CF search. The candidate frequency search method and apparatus of the present invention achieves the primary function through a two-stage process.

The present invention aids an MS in detecting the strongest pilot in a CF Search Set in two stages: (1) a schedule for the best strategy to visit pilot channels is first determined; and (2) a search procedure to measure all of the pilots in a CF Search Set is implemented. In the first stage, the best-strategy schedule is determined from various system values such as the mobile station's search capabilities and the CF Search Set size. In the second stage, the search procedure is implemented using signal strength, input power measurements and system values such as minimum threshold power and CF search sets. These two stages of the present invention allow an MS to measure all of the pilots in the CF Search Set and maintain adequate voice quality during the CF Search.

The present inventive method and apparatus is primarily intended for use in CDMA communication systems. An exemplary CDMA communication system adapted for use in the present candidate frequency search method and apparatus is described herein. However, any convenient wireless communication system can be used as long as the mobile station is capable of measuring radio frequency signal strengths and input power.

In an exemplary embodiment, the present invention complies with the IS-95B requirement for a Candidate Frequency Search to be completed before initiating a hard handoff. Although the exemplary embodiment of the present invention complies with the IS-95B specification, it is not limited for use in CDMA wireless communication systems and can be used in any wireless communication system where hard handoff procedures occur. Examples of such wireless communication systems include satellite wireless communication systems and optical wireless communication systems.

The present invention can be used in any wireless communication system where decreasing the probability of dropping calls and degrading service during a hard handoff is desirable. It should be obvious to one skilled in the wireless communication art that alternative methods of performing a CF Search may be used without departing from the scope of the present invention.

Figure 1:
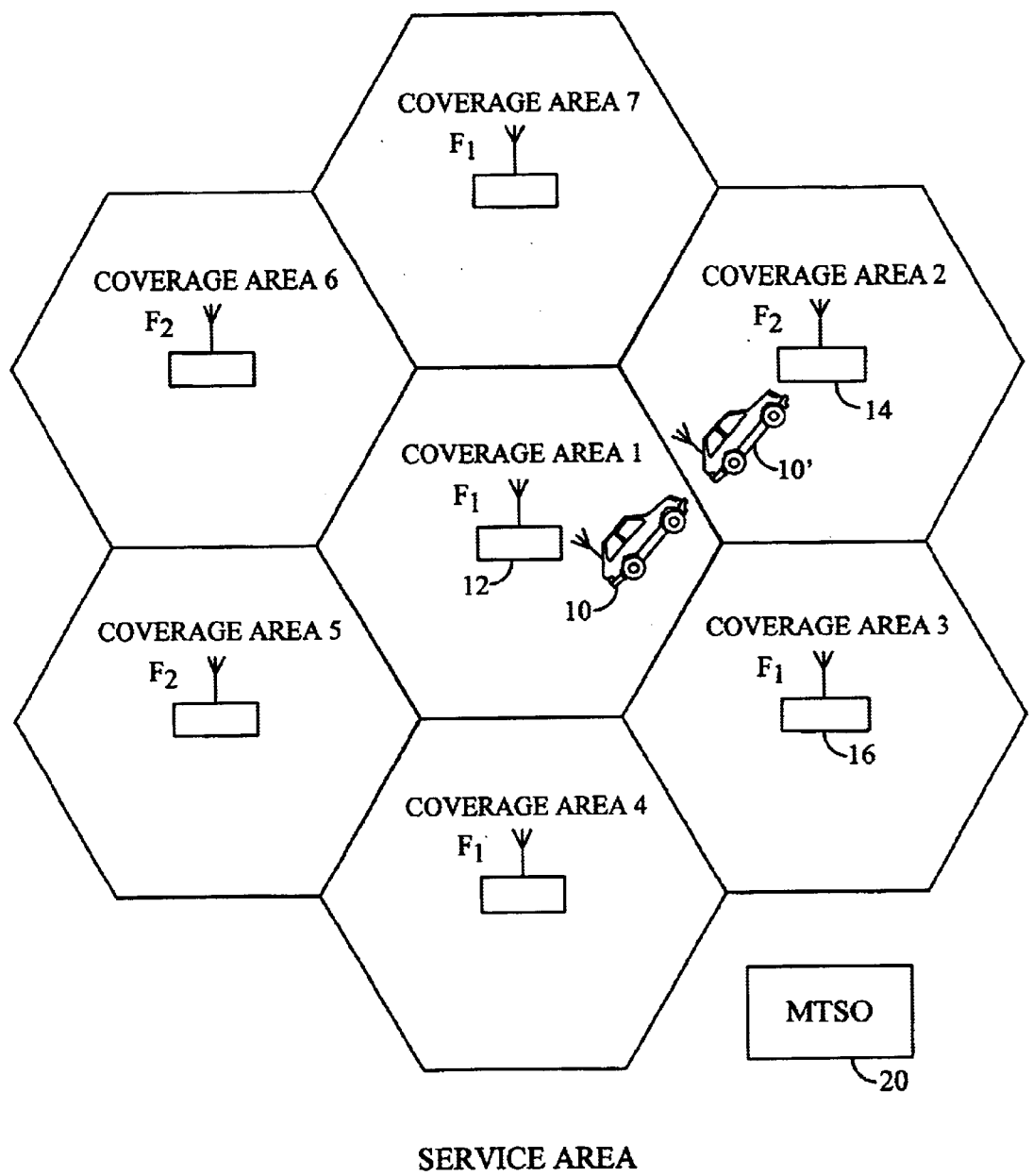
FIG. 1 shows an exemplary CDMA communication system that can be adapted for use by the present candidate frequency search method and apparatus.
Figure 2A:
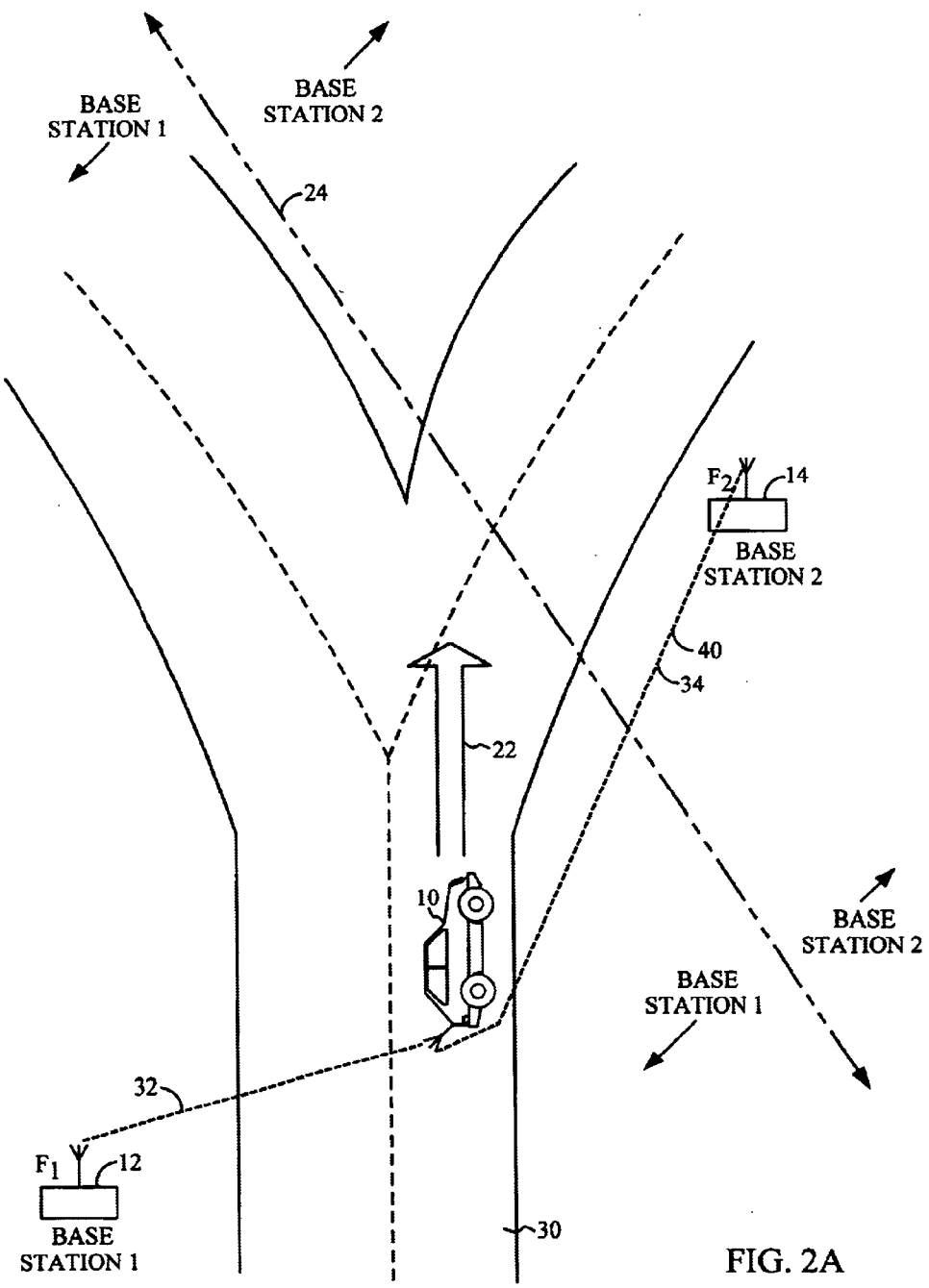
FIG. 2a shows the initial stage of a hard handoff procedure as a mobile unit approaches a boundary line between two base stations in a CDMA communication system.
Figure 2B:
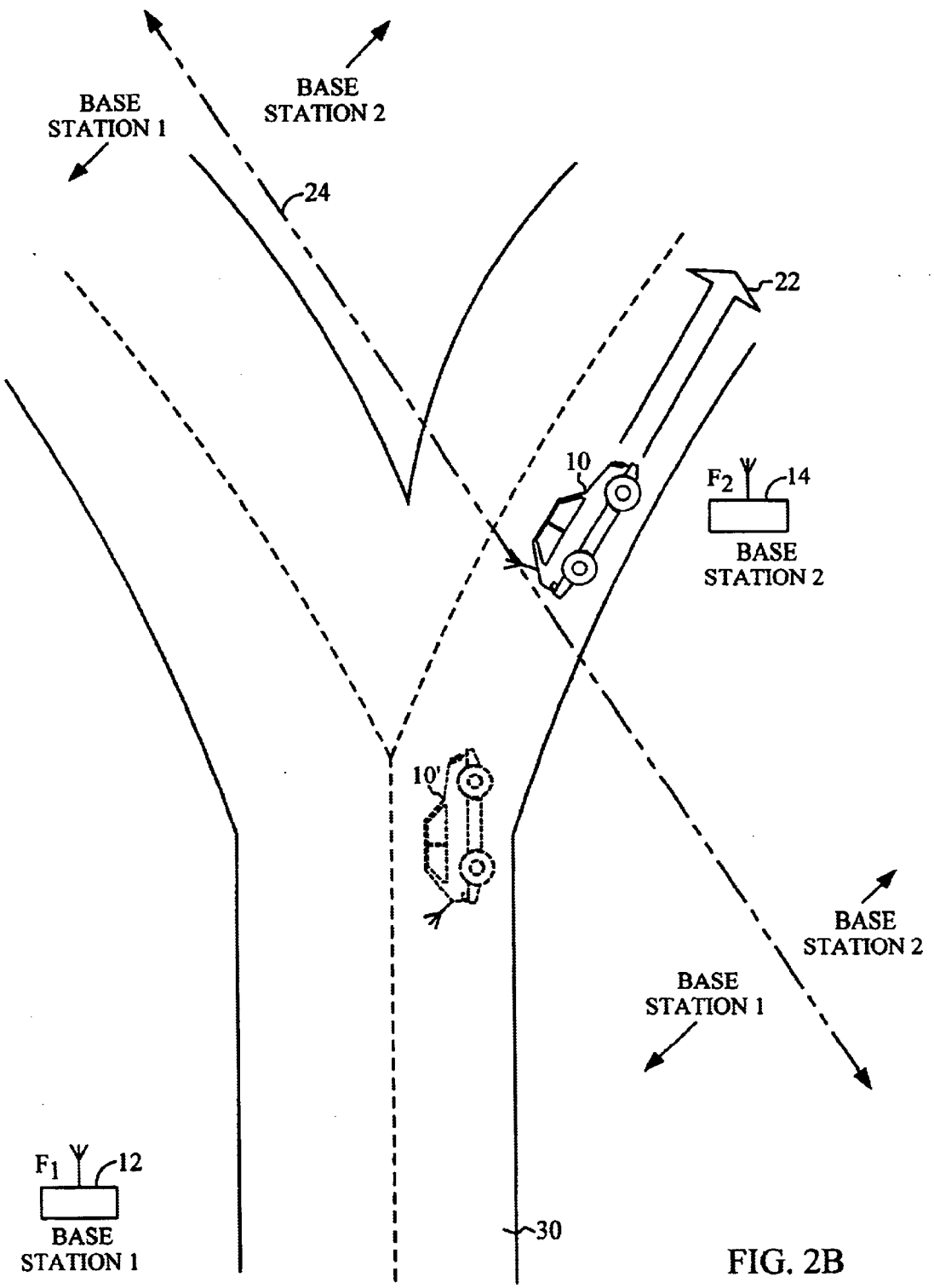
FIG. 2b shows interruption in radio link continuity during a hard handoff procedure in a CDMA communication system.
Figure 2C:
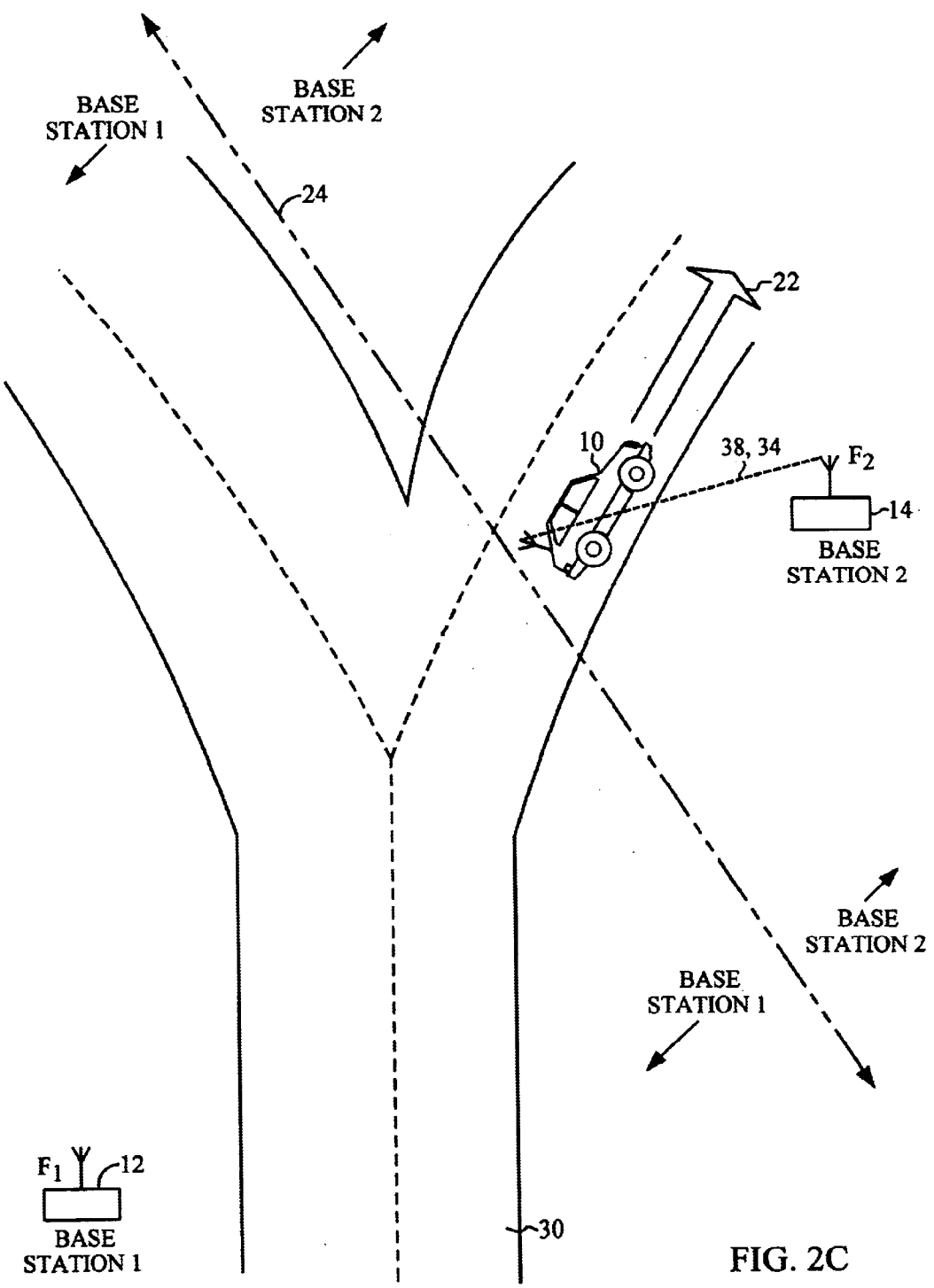
FIG. 2c shows a mobile station moving between base station coverage areas during a hard handoff procedure in a CDMA communication system.
Figure 2D:
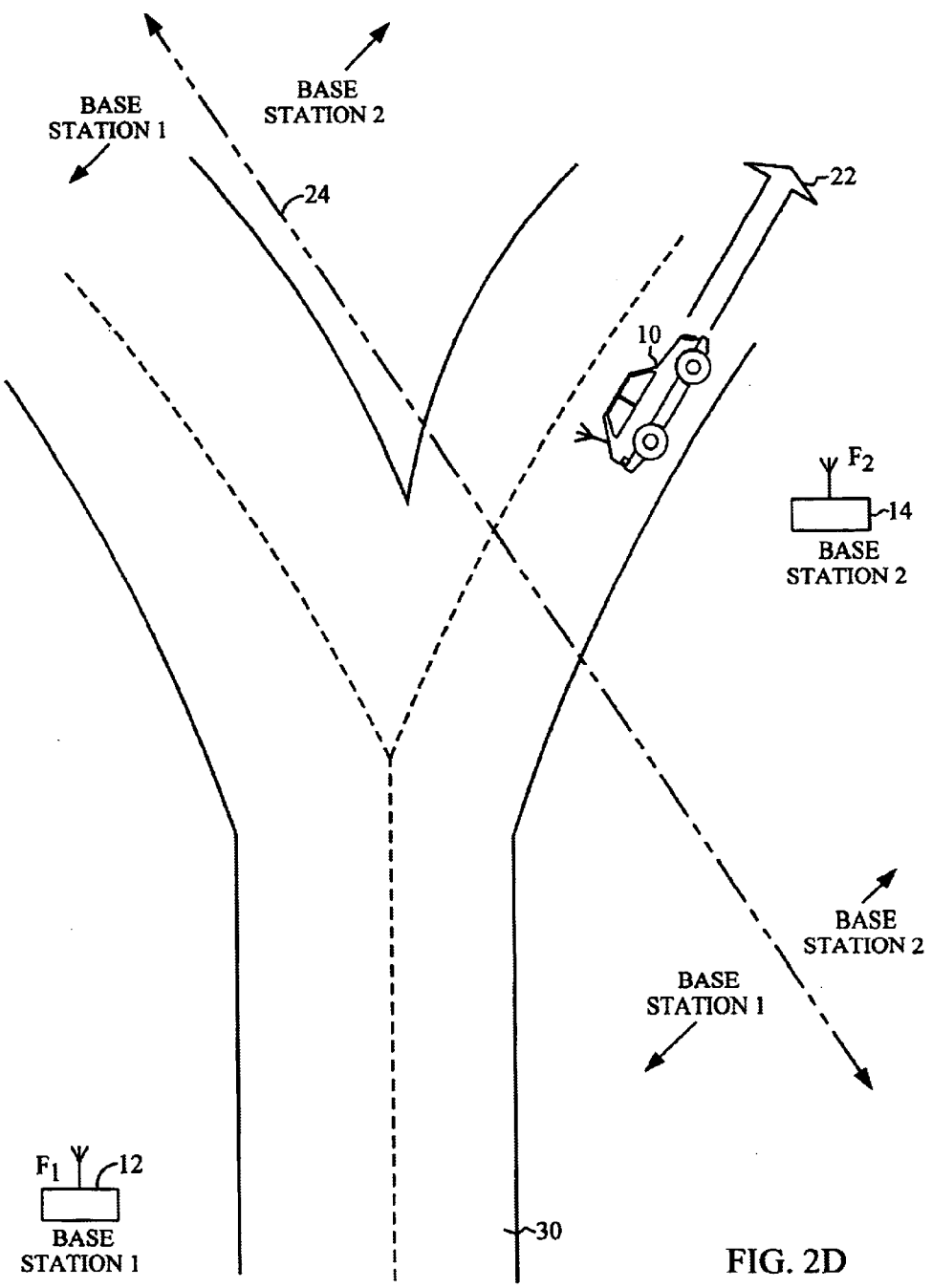
FIG. 2d shows a mobile station moving into a new coverage area during an unsuccessful hard handoff procedure.
Figure 3A:
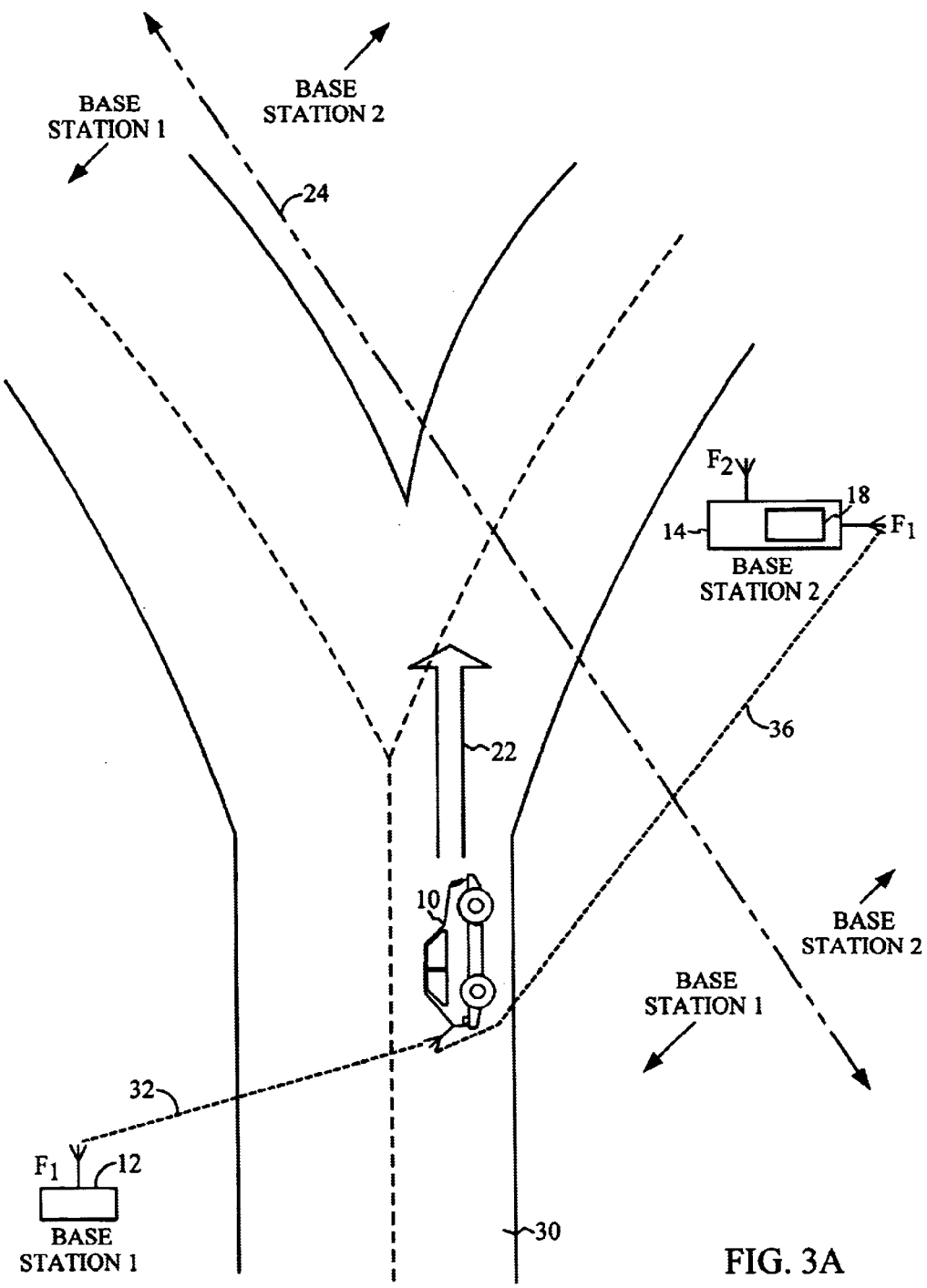
FIGS. 3a–3c depict movements of a mobile station during prior art hard handoff procedures using the well known frequency beacon method.
Figure 3B:
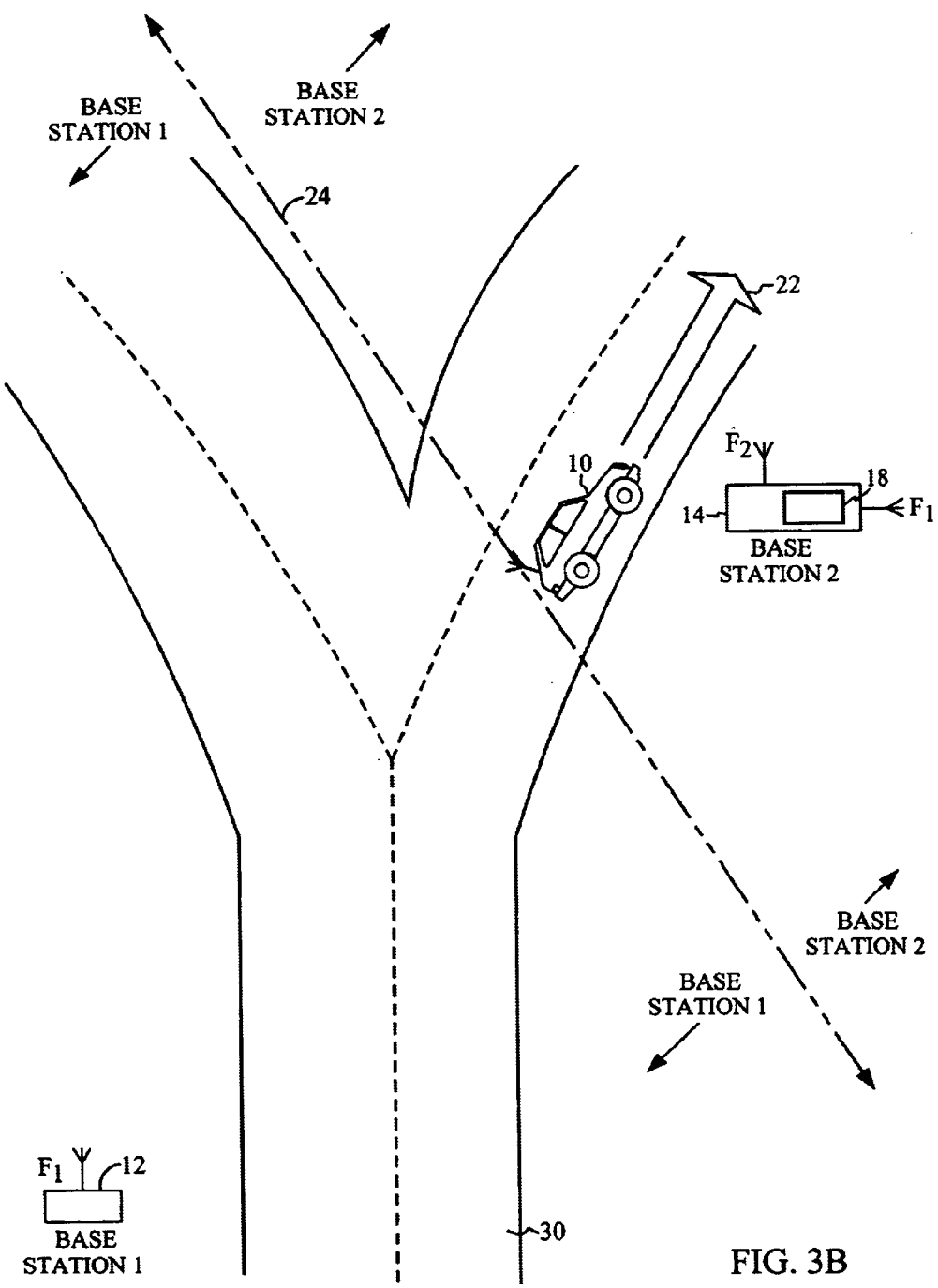
Figure 3C:
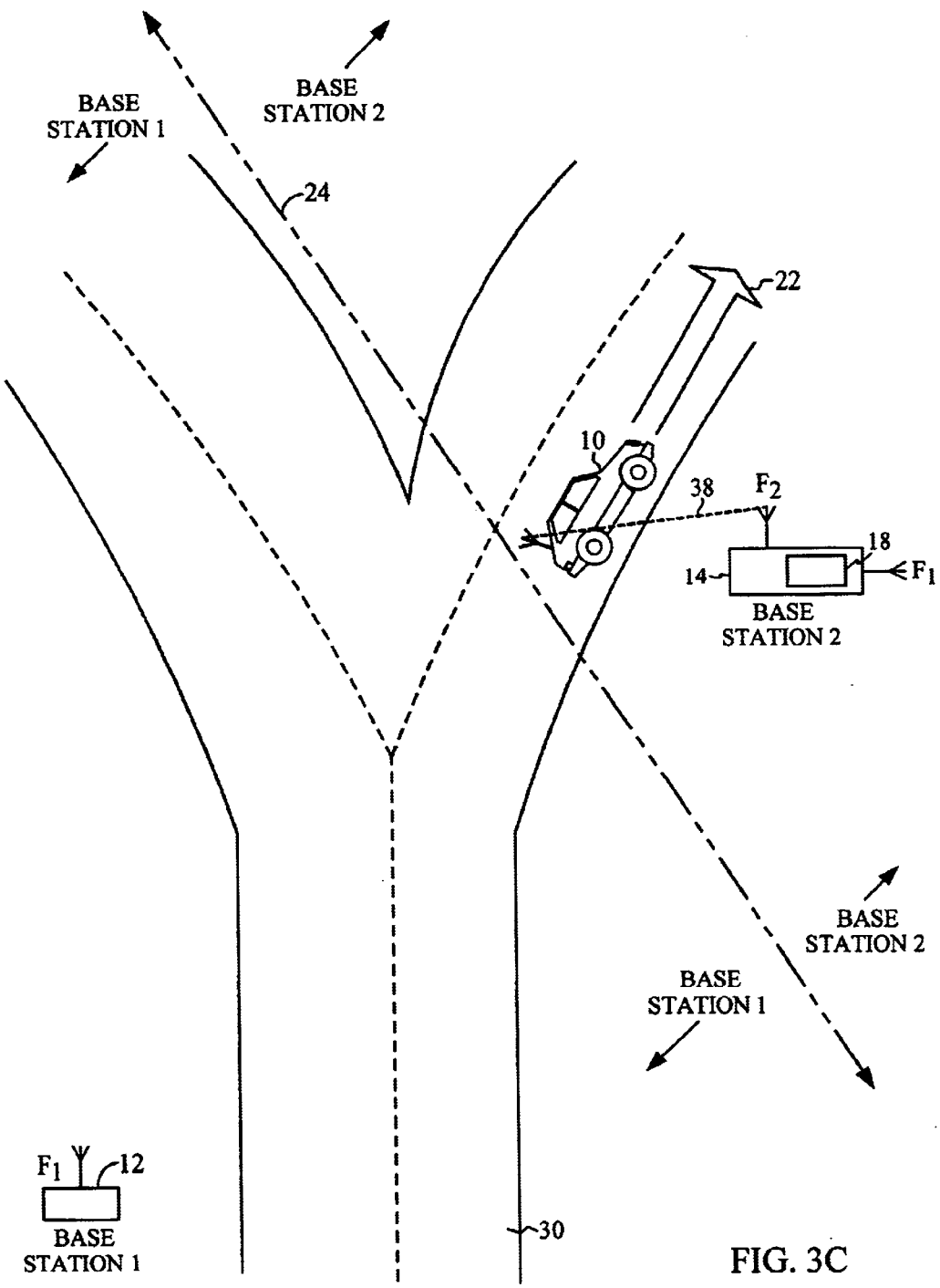
Figure 4A:
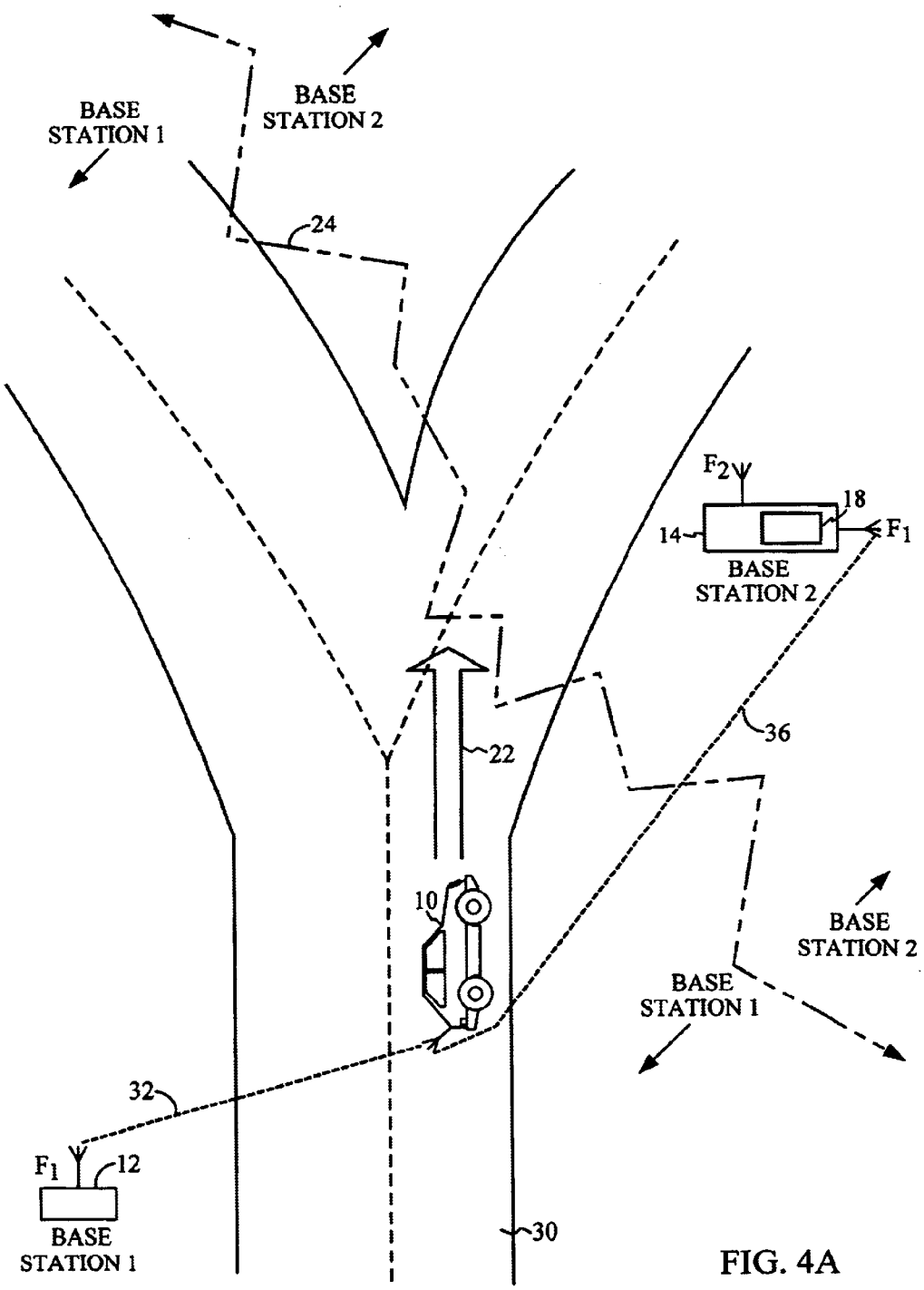
FIGS. 4a–4c show problems experienced by the prior art frequency beacon method of performing hard handoff procedures under real-world conditions.
Figure 4B:
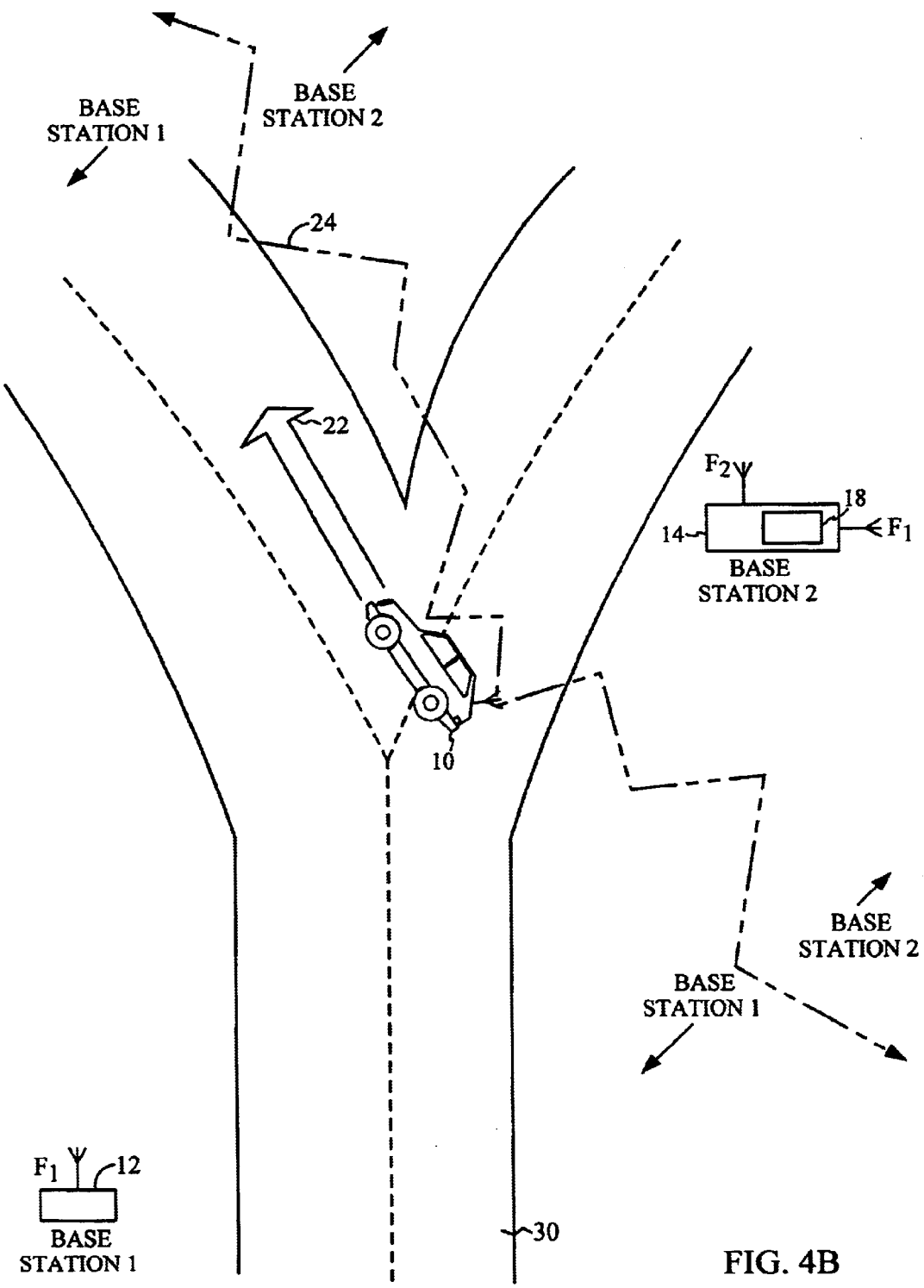
Figure 4C:
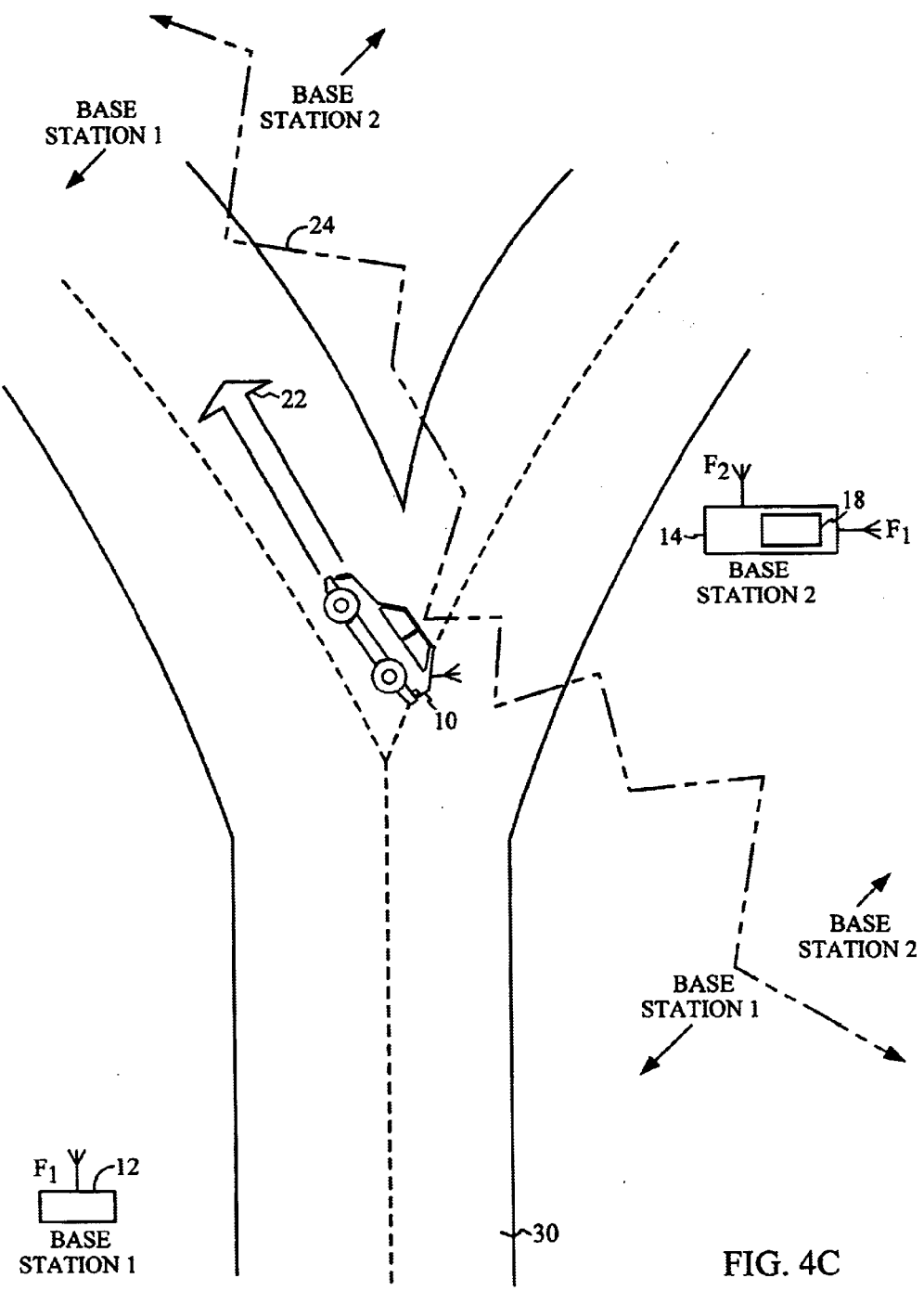

An Exemplary CDMA Communication System Adapted for use in the Present Candidate Frequency Search Method and Apparatus The present inventive method and apparatus is primarily intended for use in a CDMA communication system. However, this system description is not meant as a limitation to the present invention as the invention can be used in any wireless communication system that performs hard handoffs. FIG. 1 shows an exemplary CDMA communication system adapted for use in the present candidate frequency search method and apparatus. As shown in FIG. 1, the exemplary CDMA communication system comprises a mobile station 10 and a mobile telecommunications switching office (MTSO) 20 controlling a plurality of base stations 12, 14, 16, etc. An exemplary prior art CDMA communication system is described in U.S. Pat. No. 4,901,307, issued on Feb. 13, 1990 to Gilhousen et al. and assigned to the owner of the present invention. Any other convenient wireless communication system can be used provided that the mobile station 10 is capable of measuring frequency signal strength and input power.

As described above with reference to FIG. 1 and as described in detail in incorporated U.S. Pat. No. 5,848,063, a handoff procedure occurs when a base station 12 determines that a mobile station 10 is crossing the boundary from one coverage area to another. The base station 12 and the mobile station 10 measure the received signal strength and input power of pilot channels to determine base station boundaries and coverage areas. When the base station 12 erroneously determines that the mobile station 10 is crossing a base station boundary, a handoff is often initiated too early or too late resulting in an increased probability of a dropping the call. IS-95B offers a method to improve the probability of successfully completing a hard handoff in a wireless communication system. The present invention increases the probability of successfully completing a hard handoff without perceptibly compromising voice quality.

Figure 5:
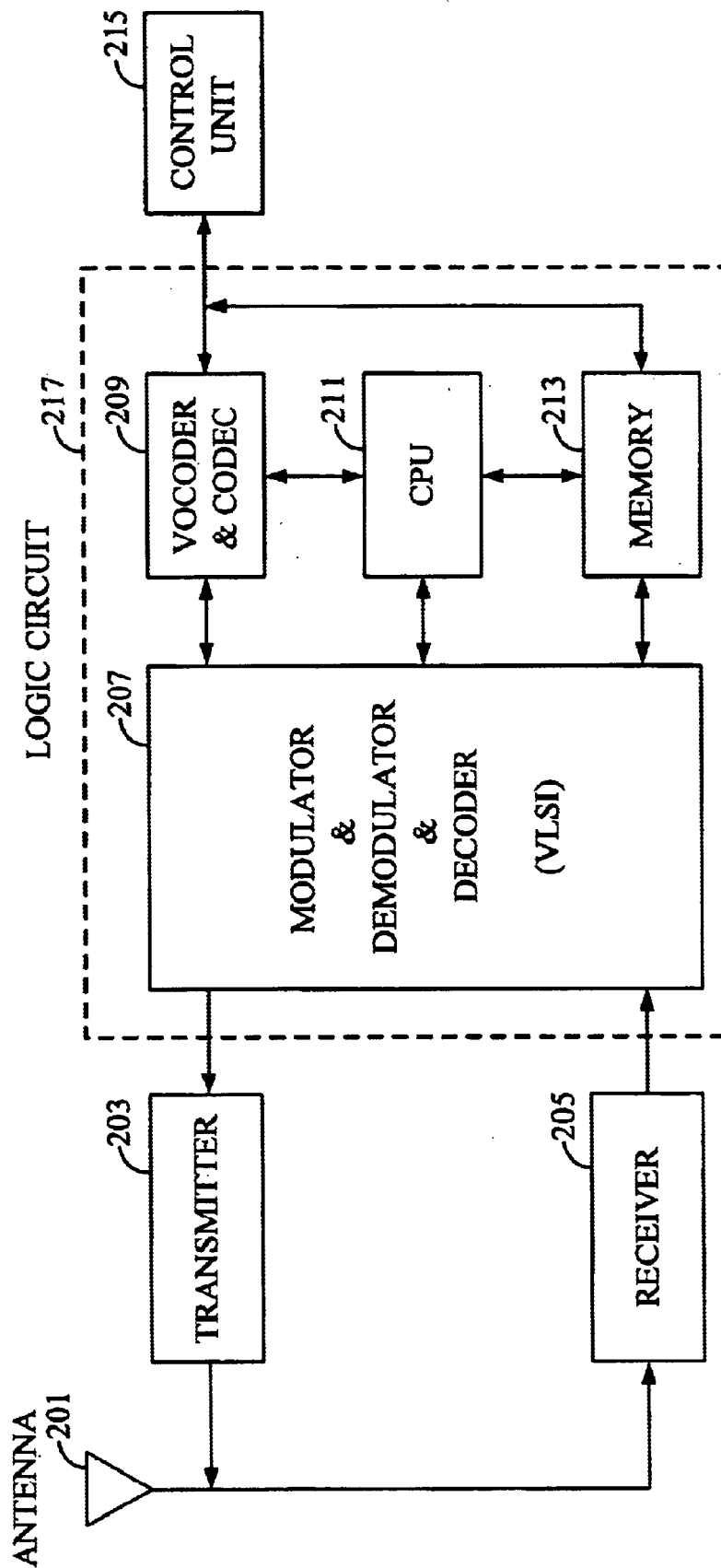
FIG. 5 shows a block diagram of an exemplary mobile station that can be adapted for use by the present candidate frequency search method and apparatus.
Figure 6:
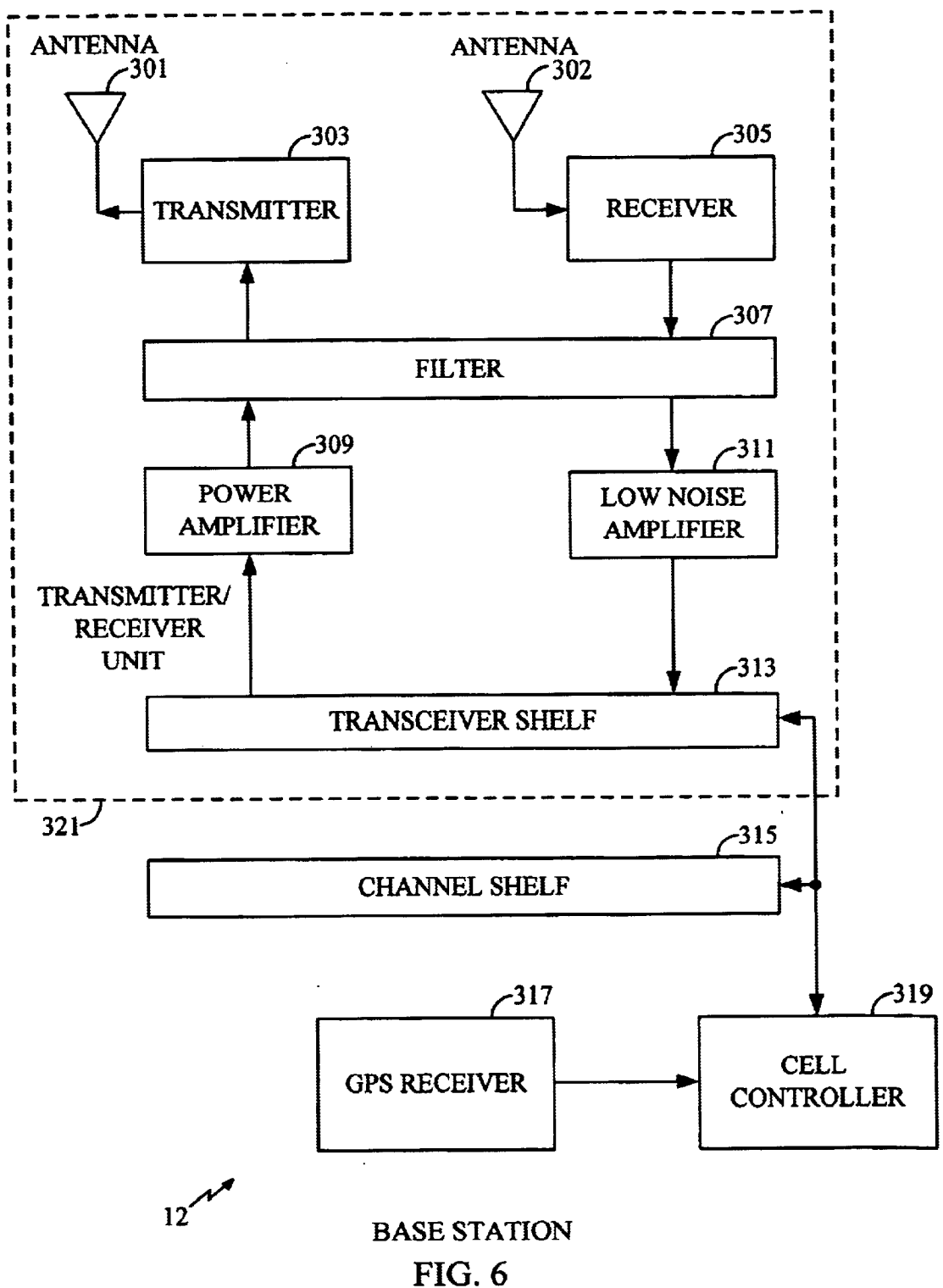
FIG. 6 shows a block diagram of an exemplary base station that can be adapted for use by the present candidate frequency search method and apparatus.

As shown in FIG. 1, the mobile station 10 is disposed on an automobile. However, this is not meant to be a limitation to the present invention and the mobile station 10 may also be disposed within a handheld unit, headset unit, or any such mobile station configuration that is well-known in the art. As described in more detail below, FIG. 5 shows a block diagram of an exemplary mobile station adapted for use with the present candidate frequency search method. Also described in more detail below, FIG. 6 shows a block diagram of an exemplary base station adapted for use with the present candidate frequency search method. Using the method and apparatus of the present invention, the mobile station 10 measures all of the pilots in the CF Search Set while maintaining adequate service quality. The mobile station reports these measurements to a base station, and the base station determines whether a handoff is required and, if so, the best pilots in the CF Search Set for the handoff.

As shown in FIG. 5 and as described in more detail in incorporated U.S. Pat. No. 4,901,307, the mobile station 10 of the present invention preferably includes an antenna 201 electronically coupled to a transmitter 203 and a receiver 205, a logic circuit 217, and a control unit 215. The logic circuit 217 preferably includes a modulator/demodulator/decoder 207, a voice coder/coder-decoder (VOCODER/CODEC) 209, a memory unit 213, and a central processing unit (CPU) 211. The method of the present invention preferably comprises software or firmware instructions that are executed by the CPU 211 (e.g., microprocessor) or other data processing or sequencing device disposed within the mobile station 10. Alternatively, the method may comprise software or firmware instructions that are executed by any convenient or desirable sequencing device such as a state machine, present state-next state discrete logic, or field programmable gate array device. In another alternative embodiment, the present CF search method is "hardwired" into the mobile station 10 and implemented using either discrete logic devices, large scale integrated (LSI) devices, very large scale integrated (VLSI) devices, or application specific integrated circuit (ASIC) devices. The individual components (e.g., control unit 215) of the mobile station 10 operate in a well-known manner and as such are not described in detail herein. The mobile station 10 transmits and receives data from the base station 12 while it is located within the coverage area of the base station 12.

As shown in FIG. 6 and as described in more detail in incorporated U.S. Pat. No. 4,901,307, the base station 12 of the present invention preferably includes a cell controller 319 electronically connected to a transmitter/receiver unit 321, a channel shelf 315, and a Global Positioning Satellite (GPS) receiver 317. The transmitter/receiver unit 321 preferably comprises a transmitting antenna 301, electronically coupled to a transmitter 303, a receiving antenna 302, electronically coupled to a receiver 305, a filter 307, a power amplifier 309, a low noise amplifier 311, and a transceiver shelf 313. The individual components of the base station 12 are well-known in the art and as such are only briefly described. The channel shelf 315 holds multiple channel elements, each of which can be configured as a traffic channel or an overhead channel. The GPS receiver 317 provides the timing to the system. The transceiver shelf 313 up-converts the output signal from the channel shelf 315 and down-converts the received signal from the receiver 305. The forward link from the transceiver shelf 313 passes through the high power amplifier 309 and the filter 307 to the transmitting antenna 301. The reverse link starts from the receiving antenna 302, passes through the filter 307 and the low noise amplifier 311. The reverse link signal is down-converted in the transceiver shelf 313 and input to the channel shelf 315. The cell controller 319 helps perform these complex tasks.

The cell controller 319 manages the operation of the base station 12 within the CDMA communication system. The cell controller 319 maintains the service status of the hardware and software entities within the base station 12, allocates and configures resources for call traffic, collects statistical information about the operation of the cell, monitors subordinate devices for detected faults, and distributes some aspects of timing information. The cell controller 319 also controls the multiplexing of the channel elements from the MTSO 20. The cell controller 319 controls handoff procedures between the mobile station 10, the serving base station 12, and the target base station 14.

The method of the present invention preferably comprises software or firmware instructions that are executed by the cell controller 319 (e.g., microprocessor) or other data processing or sequencing device disposed within the base station 12. Alternatively, the method can comprise software or firmware instructions that are executed by any convenient or desirable sequencing device such as a state machine, present state-next state discrete logic, or field programmable gate array device.

The present invention preferably comprises a two-stage process for decreasing the probability of dropping calls during hard handoff procedures. The decrease in the probability of dropped calls is made possible using the novel method of performing a Candidate Frequency search. The present invention aids mobile stations in measuring all of the pilots in a CF Search Set. The present invention is preferably implemented in two stages: (1) a schedule for the best strategy to visit pilot channels is determined; and (2) a search procedure to measure all of the pilots in a CF Search Set. These two stages of the present invention allow an MS to detect the strong CF pilots and maintain adequate voice quality during the CF Search. The two stages are now described in more detail.

Stage One—Scheduling Technique for Determining the Best Strategy for Visiting Candidate Frequencies The scheduling technique of the present invention determines the best strategy for a mobile station to visit Candidate Frequencies while reducing interruption on the forward link. The best strategy for visiting Candidate Frequencies is represented by the data values Tv, Nmpv, and Nv that are output to the Stage Two Search Procedures for visiting the candidate frequency. Tv is defined as the period of successive visits to the candidate frequency. Nmpv is defined as the number of measurements per visit. Nv is defined as the number of visits during the Freshness_Interval (described further below). The data values, Tv, Nmpv, and Nv are calculated from the mobile stations'search capabilities, the pilot measurement accuracy requirements, and the voice quality optimization requirements.

Figure 7:
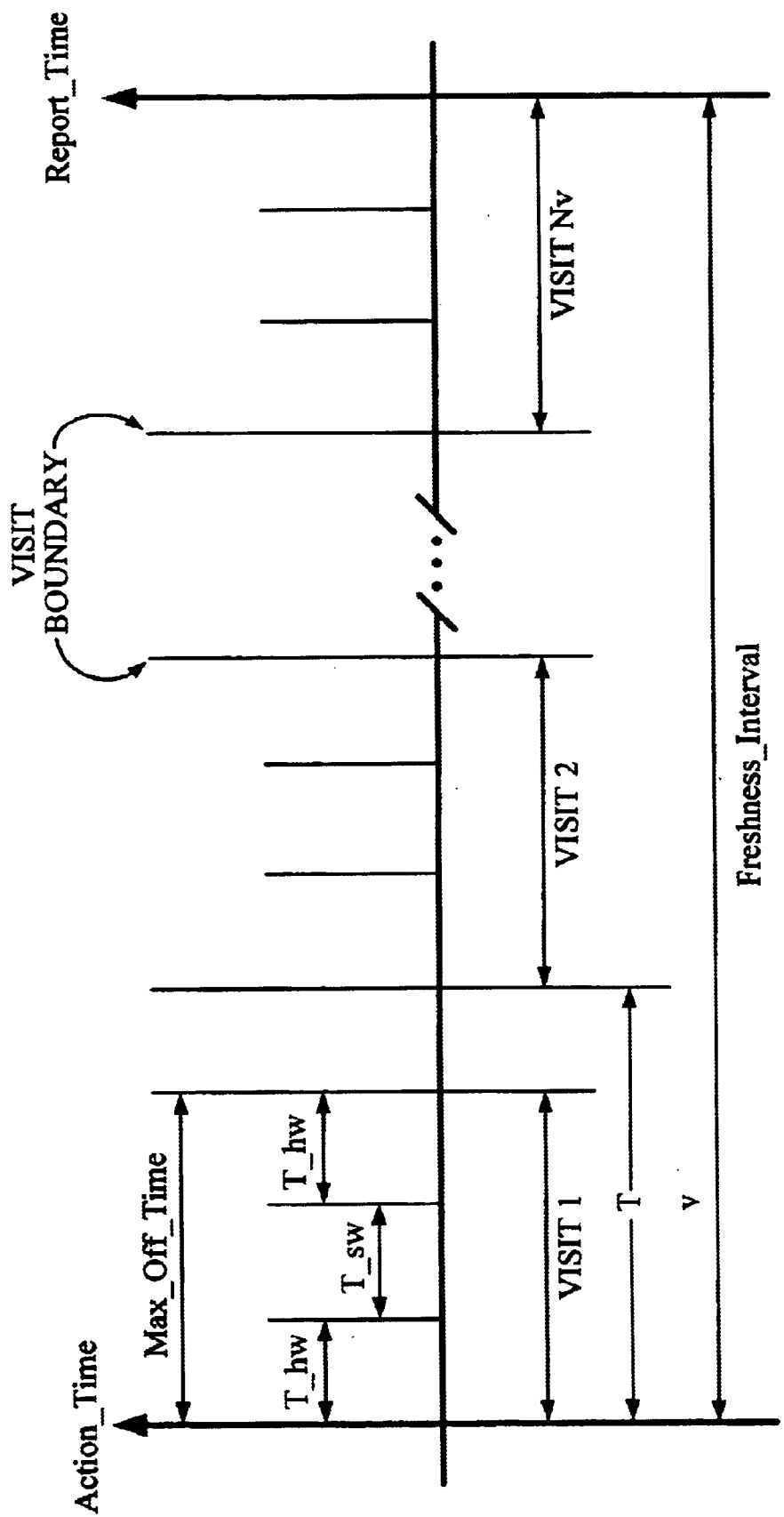
FIG. 7 depicts a timeline that can be used in performing multiple visit Candidate Frequency (CF) Searches.

FIG. 7 depicts a timeline used for a multiple visit CF Search. The timeline begins at the time "Action_Time" which is defined as the time when the CF Search actions must begin. "Report_Time" is defined as a time when the CF Search actions must end and thus the time when measurements are completed and either reported or not reported. Both the Action_Time and the Report_Time are times that are specified by either the MS or the BS for system timing purposes. The "Freshness_Interval" is defined as the interval starting at the time Action_Time within which the MS must complete the CF Search. The variable Max_Off_Time is defined as the maximum amount of time that the mobile station is allowed to remain away from the serving frequency before unacceptable adverse affects on voice quality are incurred. The Freshness_Interval is defined by the IS-95B specification. Alternatively, the Freshness_Interval can be determined by the MS or the BS. The Max_Off_Time is determined, using any well-known manner of calculating adequate voice quality. T_hw is defined as the time required by the mobile station's hardware to tune to a different frequency. T_sw is defined as the time spent by the mobile station software and hardware to measure the strength of pilots on the candidate frequency during each visit. Both the T_hw and T_sw depend upon the MS's capabilities and can be gathered by the MS or BS through a system test, a pre-determined look-up table, or via user input.

The scheduling technique of the present invention uses other data values that are not shown in FIG. 7 to aid in the calculation of Tv, Nmpv, and Nv. One such data value, Tm, is defined as the time needed to make one pilot measurement. The data value Tm depends upon the MS's capabilities and can be gathered by the MS or BS through a system test, a pre-determined look-up table, or user input. Nm is defined as the number of times a pilot is to be measured depending on the pilot measurement accuracy desired. Nm is determined by any well-known manner of calculating pilot measurement accuracy. Roff is defined as the percentage of time during the Freshness_Interval that the mobile station remains away from the SF. Roff is determined by any well-known manner of calculating acceptable voice quality degradation. A variable "Search_Size" is defined as the size of the CF Search Set and is specified by the total number of pilot channels to be searched during the CF search. Search_Time is defined as the estimate of the total amount of time in seconds for which the mobile station will need to suspend its current Forward and Reverse Traffic Channel processing in order to tune to the CF. The Search_Time is directly proportional to the Search_Size.

The steps necessary to implement the Stage One Scheduling Technique of the present invention are summarized as follows:

Step A—Obtain preliminary handoff data values.

Step B—Determine preliminary data values from the pilot measurement accuracy requirements.

Step C—Determine preliminary data values from the voice quality requirements.

Step D—Determine preliminary data values from the Mobile Station's search capabilities.

Step E—Determine Tv, Nmpv, and Nv depending upon the voice quality. If the voice quality is qualified, then set Tv, Nmpv, and Nv for multiple visits.

Else, set Tv, Nmpv, and Nv for a single visit.

Step F—Output the data values of Tv, Nmpv, and Nv to the second stage of processing of the present invention.

The scheduling technique of the present invention can either be performed at the MS or at the BS. In one embodiment, the mobile station determines the best schedule to visit a CF during a CF Search without any interaction with the BS. Alternatively, the BS alone determines the best schedule. In a preferred embodiment, the MS and BS interact together to determine the best schedule to visit a CF during a CF Search.

In Step A of a preferred embodiment of the present invention, the scheduling technique of the present invention exchanges preliminary handoff data via messages exchanged between the BS and the MS in compliance with IS-95B. The MS uses these parameters to determine the best schedule for visiting a Candidate frequency during a CF Search. As described in the IS-95B specification, a CF Search is accomplished through a series of messages that are exchanged between the BS and MS. Initially, the BS starts a CF search by sending a CF Search Request Message (CFSReqM) to the MS. The CFSReqM contains data such as the Candidate Frequency to be searched (Cdma_Freq), the threshold for CF pilot detection (Cf_T_Add), the number of pilots in the Search Set (Num_Pilots), the Search_Size, and, on occasion, the Action_Time. Report_Time is determined by the MS from the Freshness_Interval and the Action_Time. The CFSReqM data is used by the MS in both the Stage One Scheduling Algorithm and the Stage Two Search Procedure. The MS determines the Max_Off_Time and the Search_Time using any well-known manner of calculating adequate voice quality impact. Typically, the Max_Off_Time is less than 3 frames or 60 ms (milliseconds). The MS sends a CF Search Response Message (CFSRespM) back to the BS containing data such as the Max_Off_Time and the Search_Time as described in IS-95B. The BS sends a CF Search Control Message (CFSearchControlM) to the MS telling the MS to initiate either a single or periodic CF Search. After the BS sends the CFSearchControlM message, the MS continues with the scheduling technique of the present invention.

In Steps B through D of the preferred embodiment, the scheduling technique of the present invention performs a series of preliminary steps before determining the values of Tv, Nmpv, and Nv. In Step B, for example, the calculation of Nm is based upon a pilot measurement accuracy requirement of the system in a well-known manner. In Step C, the Freshness_Interval and the Roff are calculated based upon a voice quality requirement using the standard timers (T70m, T71m) and the Total_Off_Time_Fwd(rev) in the CFSRespM. One of ordinary skill in the art shall recognize that methods of determining these values based upon a voice quality requirement are well-known and therefore, these methods are not described in detail herein. In Step D, the scheduling technique determines the values of Thw, Tsw, and Tm which all depend upon the mobile station's capabilities. These values are pre-determined and retrieved from the memory 213 within the MS. Alternatively, the MS can calculate Thw, Tsw, and Tm by performing an on-demand system test.

Figure 8:
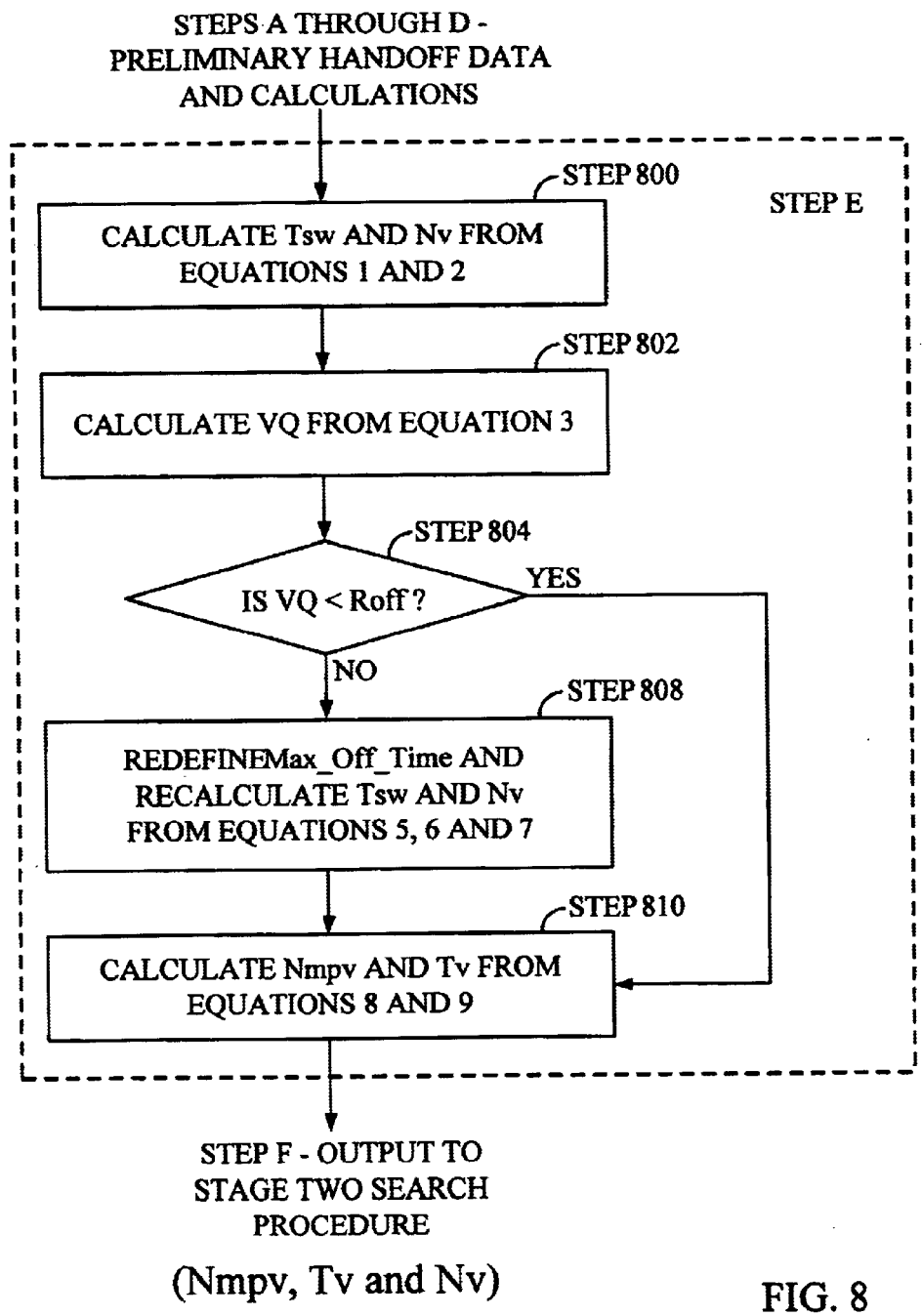
FIG. 8 shows a flowchart of an exemplary embodiment of the candidate frequency scheduling technique of the present invention.

FIG. 8 shows the algorithm of Step E of the preferred embodiment of the scheduling technique of the present invention. In Step E of the preferred embodiment, the scheduling technique of the present invention determines the values of Tv, Nmpv, and Nv using the following algorithm. Referring to STEP 800, Equations 1 and 2 (shown below) are calculated. Equation 1 shows the calculation for Tsw, the time spent by the mobile station software and hardware in measuring the strength of pilots on the candidate frequency during each visit.

$$Tsw = \text{Max\_Off\_Time} - (2 * Thw) \quad \text{(Equation 1)}$$

The initial value of Max_Off_Time is set according to the maximum time that the MS can operate off the SF while maintaining acceptable voice quality (e.g., 60 ms). Equation 2 shows the calculation for Nv, the number of CF visits to be performed within the Freshness_Interval.

$$Nv = Nm * \text{Search\_Size} * Tm/Tsw \quad \text{(Equation 2)}$$

Nv is preferably rounded down to the largest integer. Tm is defined as the time required to measure one pilot. In STEP 802, VQ is determined using Equation 3 below. VQ is a measurement of the MS's voice quality.

$$VQ = Nv * \text{Max\_Off\_Time}/\text{Freshness\_Interval} \quad \text{(Equation 3)}$$

At STEP 804 the present method determines whether the voice quality meets certain qualifications. Thus, if the total time away from the forward and reverse channels is greater than a pre-determined quantity then the voice quality is unacceptable. Equation 4 shows the voice quality qualification. To meet the voice quality qualifications, the VQ must be less than the pre-determined value of Roff. However, the present method can use different qualifications for determining voice quality acceptability. One of ordinary skill in the art shall recognize that several methods of determining these values based upon a voice quality requirement are possible. These methods are well known and therefore are not described in greater detail herein.

$$VQ < Roff \quad \text{(Equation 4)}$$

If the VQ meets the voice quality qualifications at STEP 804, then the method proceeds to a STEP 810 to calculate Nmpv and Tv according to Equations 8 and 9 below. If the VQ at STEP 804 fails to meet the voice quality qualifications, then the method proceeds to a STEP 808 to redefine Max_Off_Time and recalculate Nv and Tsw according to Equations 5, 6 and 7, given below.

At STEP 808 Max_Off_Time, Nv and Tsw are calculated according to Equations 5, 6 and 7, given below.

$$\text{Max\_Off\_Time} = Nm * \text{Search\_Size} * Tm + 2 * Thw \quad \text{(Equation 5)}$$

$$Tsw = \text{Max\_Off\_Time} - (2 * Thw) \quad \text{(Equation 6)}$$

$$Nv = 1 \quad \text{(Equation 7)}$$

At STEP 810 Nmpv and Tv are calculated in accordance with Equations 8 and 9, given below.

$$Nmpv=Tsw/Tm; \qquad \text{(Equation 8)}$$

$$Tv=\text{Freshness\_Interval}/Nv \qquad \text{(Equation 9)}$$

In summary of Step E of the Present Stage One Scheduling Technique, the data values of Tv, Nmpv, and Nv are calculated according to the voice quality (VQ). If VQ<Roff, then Equations 1, 2, 8 and 9 are used to calculate Tv, Nmpv and Nv. If VQ>Roff, then Equations 5, 6, 7, 8 and 9 are used to calculate Tv, Nmpv and Nv.

In Step F of the Present Stage One Scheduling Technique, the data values of Tv, Nmpv, and Nv are output to the Stage Two Search Procedure technique of the present invention.

In an alternative embodiment, the MS performs the scheduling technique of the present invention without interacting with the BS. In this embodiment of the present invention, the MS recalls all handoff parameter data from internal memory (e.g., from the memory 213). This handoff parameter data includes Cdma_Freq, Cf_T_Add, Num_Pilots, Search_Size, Action_Time, Max_Off_Time, and Search_Time. In accordance with this embodiment, in Step B, the calculation of Nm is based upon a pilot measurement accuracy requirement of the system and is obtained in a well-known manner. One of ordinary skill in the art shall recognize that methods of determining Nm based upon a pilot measurement accuracy requirement are well known. Therefore, these methods are not described in more detail herein. In Step C, the Freshness_Interval and the Roff are calculated based upon any well-known manner. In IS-95B the Freshness_Interval is defined as a time interval where pilot measurements are considered valid. In Step D, the alternative scheduling technique determines the values of Thw, Tsw, and Tm, which all depend upon the Mobile Station's capabilities. In the alternative embodiment, these values are pre-determined and are retrieved from the memory within the MS. In yet another alternative embodiment, the MS can calculate the values of Thw, Tsw, and Tm by performing an on-demand system test. In Step E of this alternative embodiment, the scheduling technique of the present invention determines the values of Tv, Nmpv, and Nv using the same algorithm as used by the exemplary embodiment described above. In Step F, the data values of Tv, Nmpv, and Nv are output to the Stage Two Search Procedure technique of the present invention.

In yet another embodiment of the present invention, the BS performs Steps A through E of the scheduling technique without interacting with the MS. In Step A of this alternative embodiment of the present invention the BS recalls all handoff parameter data from internal memory. This data includes Cdma_Freq, Cf_T_Add, Num_Pilots, Search_Size, Action_Time, Max_Off_Time, and Search_Time. In Step B, the BS preferably calculates the value for Nm based upon a pilot measurement accuracy requirement of the system in any well-known manner. In Step C, the BS preferably specifies the Freshness_Interval and the Roff based upon any well-known manner. In Step D, the BS determines the values of Thw, Tsw, and Tm which all depend upon the Mobile Station's capabilities. In this alternative embodiment, the BS uses a look-up table to recall these pre-determined values based on the type of MS. In Step E, the scheduling technique of the alternative embodiment of the present invention preferably determines the values of Tv, Nmpv, and Nv using the same algorithm as used by the exemplary embodiment described above. In Step F, the data values of Tv, Nmpv, and Nv are transmitted to the MS and output to the Stage Two Search Procedure technique of the present invention.

After completing the Stage One Scheduling Technique of the present invention, the schedule for the best strategy to use for visiting all pilots on the candidate frequency with a reduction in interruption in the forward and reverse link is represented by the data values of Tv, Nmpv, and Nv. The schedule developed in the Stage One Scheduling Technique of the present invention is implemented in the Stage Two Search Procedures for visiting a candidate frequency.

Stage Two—Search Procedure for Visiting a Candidate Frequency

The search procedure for visiting a candidate frequency of the present invention schedules visits to the CF while maintaining satisfactory voice quality. The search procedure preferably uses the values of Tv, Nmpv, and Nv that are output by the Stage One Scheduling Technique (described above) for visiting the candidate frequency.

The steps for implementing the Stage Two Search Procedure of the present invention are summarized as follows:

Step A—Receive data from the Stage One Scheduling Technique. [e.g., Tv, Nmpv, Nv]

Step B—Determine preliminary data values, (e.g., Cf_T_Add and Nm), as obtained from the pilot measurement accuracy requirements. Determine preliminary data values (e.g., Max Off_Time and Freshness_Interval) from the voice quality optimization requirements. Determine the CF Search Set.

Step C—Initialize a counter and data arrays for each pilot in the CF Search Set. Initialize two data sets: C and NC. Set C contains the pilots that are strong candidates for reporting. Set NC contains the pilots that are not strong candidates for reporting.

Step D—Wait for the ActionTime. If this is the first visit, tune to the CF;

otherwise wait for the next CF search boundary. Measure the strength of the received power of the CF and determine its relative strength. If the CF received power is relatively weak, then proceed to Step E. Else proceed to Step F.

In an alternative embodiment of Step D, the CF received power is compared to the power of the SF. If the CF power is less than a certain amount of the SF power, then proceed to Step E. Else, proceed to Step F.

Step E—Tune to SF. Update the records of the M pilots to reflect a weak pilot measurement. Proceed to Step H.

Step F—Measure the first M pilots of the CF Search Set. Update each of the M pilots' counter and data arrays. Remove each of the M pilots from the CF Search Set and send it to either the C set, the NC set, or the end of the CF Search Set based on its data measurements. Proceed to Step G.

Step G—If all of the pilots in the CF Search Set are measured, then go to Step H. Else, go to Step D.

Step H—Average the "good" measurements for each pilot in set C. If the sum of ECIO measurements for a certain pilot is greater than a predetermined threshold, then report the pilot. Else, do not report.

Figure 9A:
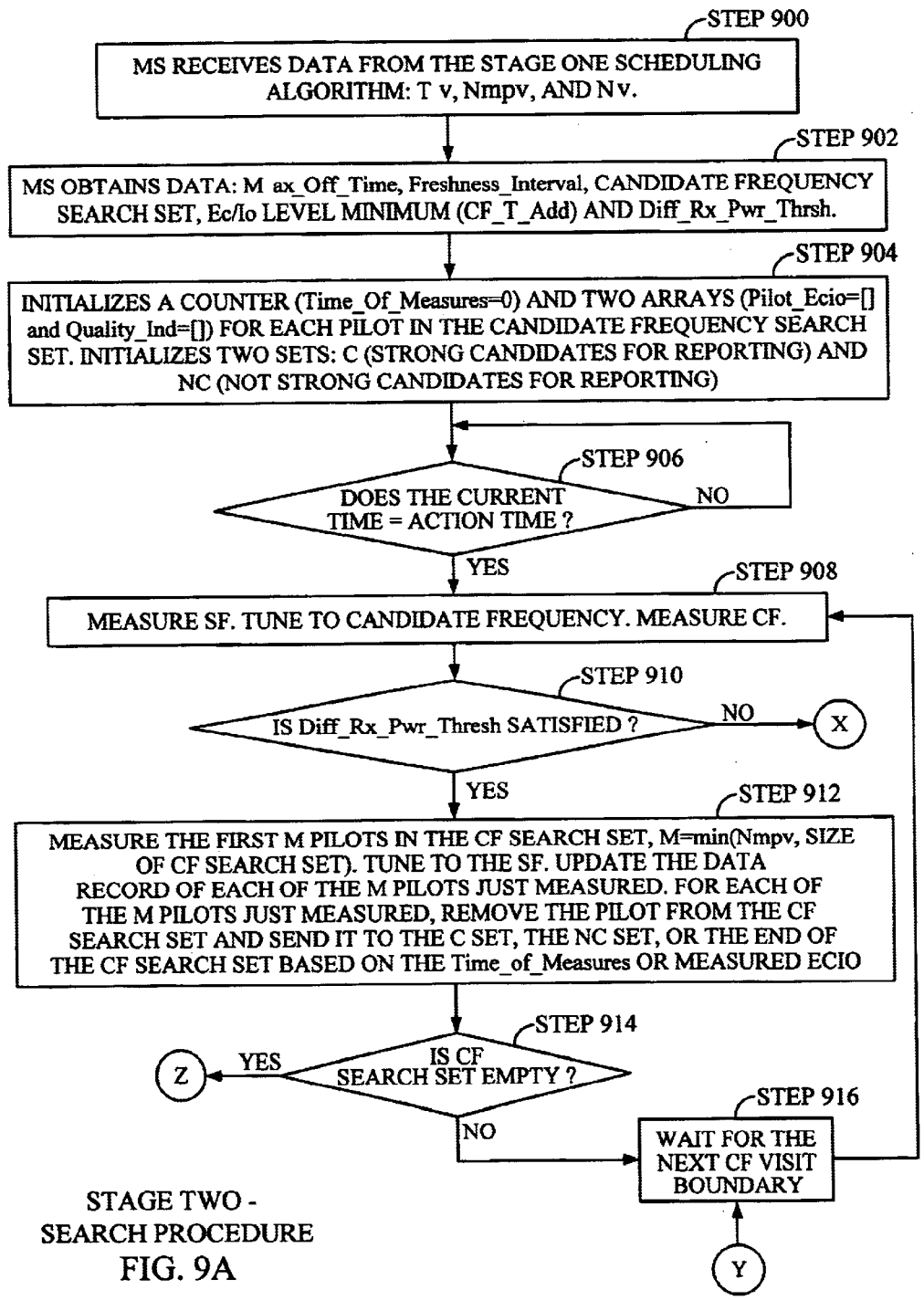
FIGS. 9a–9b show a flowchart of an exemplary embodiment of the candidate frequency search procedure of the present invention.
Figure 9B:
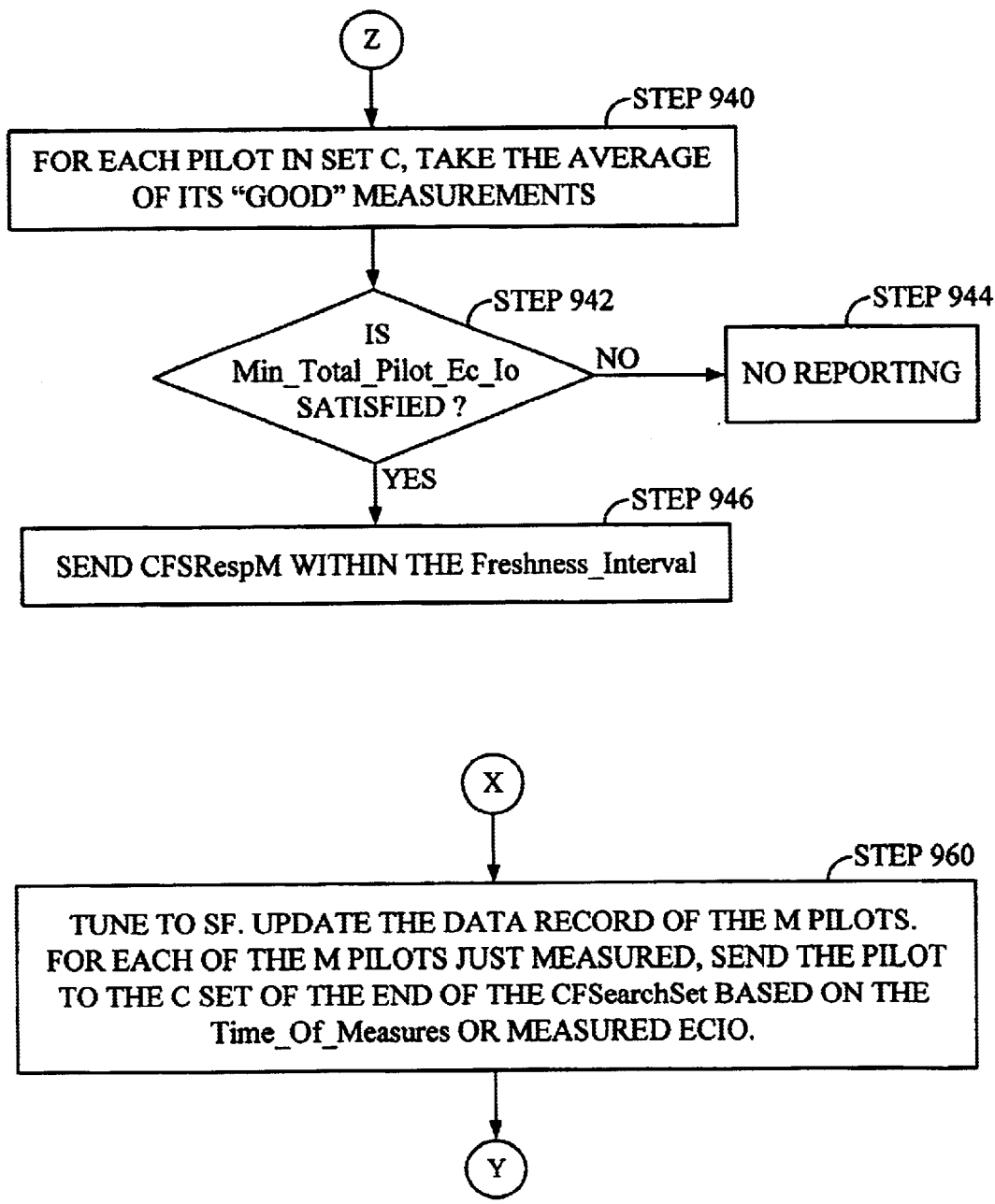

FIGS. 9a and 9b show an exemplary embodiment of the Stage Two search procedure described above. As shown in FIG. 9a, in a Step 900, the MS receives the output data of Tv, Nmpv, and Nv from the Stage One Scheduling Technique. The search procedure proceeds to a Step 902 that implements Step B (described above) of the exemplary embodiment. In the exemplary embodiment, the BS determines the preliminary data values for the CF Search Set, Freshness_Interval, Nm, Diff_Rx_Pwr_Thrsh and Cf_T_Add. Diff_Rx_Pwr_Thrsh is the power difference between a SF and a CF that can terminate a visit. Cf_T_Add is the ECIO level above which a pilot is considered strong enough for reporting. In the exemplary embodiment, the MS determines the Max_Off_Time. In a first alternative embodiment, the BS determines the preliminary data values for the Max_Off_Time, Freshness_Interval, CF Search Set, Nm, Diff Rx_Pwr_Thrsh and Cf_T_Add, and the MS receives these data values from the BS. In a second alternative embodiment, the MS receives these data values from an internal look-up table, internal memory, or user input.

Step 904 implements Step C (described above) of the exemplary embodiment of the search procedure. In Step 904, a counter and two data arrays are initialized for each pilot to be measured in the CF Search Set. The counter, Time_Of_Measures, is used to determine the number of times the pilot has been measured during the Stage Two Search Procedure. Each pilot's counter is initially set to zero. Each pilot is also assigned a first data array, Pilot Ecio, and a second data array, Quality_Ind. The Pilot_Ecio array records ECIO measurements. The Quality_Ind array records the quality of the measurements. If the total RF power is too low, then the measurement is abandoned. Also, two data sets are initialized for reporting purposes in Step 904. In subsequent steps, pilots having strong measurements are placed in a first set. This first set is referred to as the C set. Pilots having weak measurements are placed in a second set. This second set is referred to as the NC set. At the end of the search procedure, pilots in the C set with averaged ECIO>CF_T_Add values are to be reported, while the NC set is not reported. After Step 904, the search procedure of the present invention proceeds to a Step 906. Steps 906–910 and 916 implement Step D (described above) of the exemplary embodiment of the search procedure. In Step 906, the MS waits until the ActionTime is reached. When the ActionTime is reached, the search procedure proceeds to a Step 908. The MS then tunes to the CF and measures received power and records the CF. In a Step 910 of the exemplary embodiment, the MS determines if the Diff_Rx_Pwr_Thresh is satisfied. The received power on the SF is continuously measured and stored by the MS. The Diff_Rx_Pwr_Thresh is described in IS-95B and thus is not described in more detail herein. If the Diff_Rx_Pwr_Thresh is satisfied, the present inventive method proceeds to a Step 912. Else, the present invention proceeds to a Step 960 (FIG. 9b).

In an alternative embodiment, at Step 910, the present inventive method compares the received RF power as received on the CF to that received on the SF. If the received RF power of the CF is greater than the received RF power of the SF, the method proceeds to Step 912. Else, the method proceeds to Step 960. Step 960 implements the Step E (described above) of the exemplary embodiment of the search procedure. The steps necessary to implement Step 960 of the exemplary embodiment are summarized as follows:

Step E1—Tune to SF.
Step E2—Update the data records of the first M pilots in the CF Search Set as follows:
  a) Pilot_Ecio=[Pilot_Ecio, —20 dB]; (i.e., append the element "—20 dB" to the end of the Pilot_Ecio array)
  b) Quality_Ind=Bad
Step E3—For each of the M pilots do the following:
  a) If Time_of_Measures=Nm, move the pilot to set C.
  b) If Time_of_Measures<Nm, move the pilot to the end of CF Search Set.
Step E4—Go to Step 916.

As shown in FIG. 9b, at the Step 960 the MS tunes to the SF and updates the data records for the first M pilots. The Pilot_Ecio array is updated with a Pilot_Ecio measurement of "—20 dB" to reflect a weak Pilot_Ecio measurement. The number–20 dB is simply a representation of a very low Ec/Io level. As one of ordinary skill in the art shall recognize, the "20 dB" figure can be any arbitrary number that reflects a relatively low signal level. The Quality_Ind array stores a value for the quality of a pilot. A pilot with a relatively low signal level is designated as "bad". Thus, when the total RF power of F2 is less than the total RF power of F1 by certain amounts as measured in Step 910, the Quality_Ind array stores a value of "bad" for the pilot. Further in Step 960, after updating the data records of the first M pilots, the search procedure of the present invention transfers each pilot of the first M pilots of the CF Search Set to one of two sets. Each pilot is taken from the CF Search Set and transferred to either the C set or the end of the CF Search Set. As stated above, the C set comprises the set of pilots to be reported to the BS. The exemplary embodiment of the present invention determines to which set (i.e., either the C set or the CF Search Set) a pilot is transferred to based on the pilot's Time_Of_Measures value. In the exemplary embodiment, the pilot is sent to the C set if the Time_Of_Measures=Nm (fixed number of measurements to be confident of a quality measurement determined by the MS). However, the pilot is transferred to the end of the CF Search Set if the Time_Of_Measures<Nm. After transferring the pilot to one of the two sets, the search procedure proceeds to Step 916 (FIG. 9a).

Step 912 implements Step F (described above) of the exemplary embodiment of the search procedure. In Step 912, the MS measures the Pilot_Ecio and the Quality_Ind for the first M pilots in the CF Search Set, where M is defined as the lesser of two values for the number of measurements per visit and the size of the CF Search Set. After tuning back to the SF, the present method updates the data records of the first M pilots. The counter for each pilot, Time_Of_Measures, is updated by incrementing it by one to reflect the current number of times that the pilot has been measured. The Pilot_Ecio array is updated with the Pilot_Ecio measurement. The Quality_Ind array stores a value for the quality of a pilot. A pilot with a relatively high power level is designated as "good". Thus, when the Diff_Rx_Pwr_Thresh is satisfied in Step 910, the Quality_Ind array stores a value of "good" for the pilot.

Further in Step 912, after updating the data records of the first M pilots, the search procedure of the present invention transfers each pilot of the first M pilots of the CF Search Set to one of three sets. Each pilot is taken from the CF Search Set and transferred to either the C set, the NC set, or the end of the CF Search Set. The C set is the set of pilots that are possible candidates for reporting to the BS and the NC set is the set of pilots that are not to be reported. The exemplary embodiment of the present inventive method determines which set a pilot is to be transferred to, based on the pilot's Time_Of_Measures and Measured_Ecio values. In the exemplary embodiment of the present inventive method, the pilot is transferred to set C if the Time_Of_Measures=Nm (fixed number of measurements to be confident of a quality measurement determined by the MS), or if Measured_Ecio>Cf_T_Add+Deltal (a fixed threshold). Deltal is a relatively small number representing a range of values close to CF_T_Add. The value of Cf_T_Add+Deltal is not meant to be a limitation to the present invention and can assume different values as a person of ordinary skill in the art shall recognize. In the exemplary embodiment the pilot is transferred to the end of the CF Search Set if the Time_Of_Measures<Nm and the Measured_Ecio lies within the range of [Cf_T_Add−Delta2, Cf_T_Add+Delta1]. The values of Cf_T_Add—Delta2 and Cf_T_Add+Delta1 are not meant to be a limitation to the invention and can assume different values as those skilled in the art shall recognize. The pilot is transferred to the NC set if it has not already been transferred to the C set or the end of the CF Search Set. After the pilot is transferred to one of the three sets, the search procedure proceeds to the Step 914 as shown in FIG. 9*a*.

Step 914 implements the Step G (described above) of the exemplary search procedure. In Step 914, the present inventive method determines whether the CF Search Set is empty. If there are pilots still remaining in the CF Search Set, then the present inventive method proceeds to Step 916. If there are no pilots remaining in the CF Search Set, then the present invention proceeds to a Step 940.

Step 916 implements Step H (described above) of the exemplary embodiment of the search procedure. In Step 916, the MS waits for the next CF visit boundary. A CF visit boundary is the start time of the next visiting period (see FIG. 7). When the next CF visit boundary is reached, the present invention returns to the Step 908, and the method proceeds as described above.

Steps 940–946 implement the Step I (described above) of the exemplary embodiment of the present search procedure. In the Step 940, the search procedure calculates the average of pilot measurements having a Quality_Ind rating of "good" in the C set. Averaging the "good" measurements for each pilot in the C set is not meant to be a limitation to the present invention. One of ordinary skill in the art shall recognize that any well-known statistical method of measuring a set of data to determine relative strength may be used without departing from the scope of the present invention. In Step 942, the exemplary embodiment of the present invention determines if Min_Total_Pilot_Ec_Io is satisfied. The Min_Total_Pilot_Ec_Io is preferably indicated by the BS in the CFSReqM. In the preferred embodiment, if the Min_Total_Pilot_Ec_Io applies, then the search procedure compares the Min_Total_Pilot_Ec_Io to the sum of the average of the "good" measurements that are above Cf_T_Add calculated in Step 940. One of ordinary skill in the art shall recognize other statistical methods of determining a "good" measurement. For example, an average of the "good" measurements can be used in an alternative embodiment. If the Min_Total_Pilot_Ec_Io is less than the sum of the average of the "good" measurements, the present inventive method proceeds to Step 946. Else, the method proceeds to Step 944. In Step 946, the method transfers the CFSRespM within the time period defined by the Freshness_Interval. In Step 944, the present method determines not to report. Thus, "good" pilots with averaged measurements above Cf_T_Add are reported if Min_Total_Pilot_Ec_Io is satisfied. The exemplary embodiment of the Stage Two Search Procedure concludes at either Step 944 or at Step 946.

In summary, the Stage Two Search Procedure for visiting candidate frequencies of the present invention schedules visits to the CF while maintaining satisfactory voice quality. The Stage Two Search Procedure uses information from the Stage One Scheduling Technique for visiting a candidate frequency. The Stage One Scheduling Technique determines the best strategy to visit a candidate frequency. Once the best strategy is determined, the Stage One information is passed to the Stage Two Search Procedure. In Stage Two, the present invention implements the best strategy to visit a candidate frequency. During Stage Two search parameters are processed and the information gathered is used to visit a candidate frequency. A candidate frequency having a relatively high strength is noted by the system for a possible handoff.

The present invention decreases the probability of dropped calls occurring using a novel method of detecting strong pilots on the candidate frequency. The present invention aids an MS in detecting the strongest pilot on a CF in two processing stages: (1) a schedule for the best strategy to visit pilot channels is determined; and (2) a search procedure to determine the strong pilot channels is implemented. These two stages of the present invention allow an MS to detect strong pilots on a CF and to maintain adequate voice quality during the CF Search.

A number of embodiments of the present invention have been described. Nevertheless, it will be understood that various modifications may be made without departing from the spirit and scope of the invention. For example, the scheduling technique of the present invention can either be performed at the MS or at the BS. In one embodiment, the mobile station determines the best schedule to visit pilots on a CF during a CF Search without any interaction with the BS. Alternatively, the BS alone determines the best schedule. In a preferred embodiment, the MS and BS interact together to determine the best schedule to visit pilots on a CF during a CF Search.

Accordingly, it is to be understood that the invention is not to be limited by the specific illustrated embodiment, but only by the scope of the appended claims.

What is claimed is:

1. A method of scheduling a candidate frequencies search in a wireless mobile station communication device (MS) operating on a sending frequency (SF) according to IS-95B (Interim Standard 95B) communicating with a base station (BS), the method comprising:

(a) selecting a Max_Off_Time according to the maximum time the MS can operate off the SF while maintaining acceptable voice quality;

(b) calculating time for searching for pilot signals (Tsw), where Tsw=Max_Off_Time−(2* Thw) and where Thw is defined as the time required by the MS to tune to a new frequency;

(c) calculating the number of visits (Nv) to candidate frequencies during a freshness interval provided from the BS to the MS, and as defined by IS-95B; according to the equation Nv=Nm*Search_Size*Tm/Tsw, where:
   Search_Size is defined as a number representing pilot channels to be searched during a candidate frequencies search,
   Tm is defined as the time required to make one pilot measurement, and
   Tsw is defined as the time required by the mobile station to measure the strength of pilots on a candidate frequency during a visit to the candidate frequency, (d) calculating (voice quality) VQ according to the equation VQ=Nv*Max_Off_Time/(the freshness interval);

(e) determining if VQ<Roff, where Roff is a predetermined level of acceptable voice quality, and if VQ<Roff proceeding to step (g);

(f) redefining Max_Off_Time and recalculating Tsw and Nv from:
Max_Off_Time=Nm*Search_Size*Tm+2Thw,
Tsw=Max_Off_Time−(2*Thw), and
Nv=1;

(g) calculating Nmpv and Tv from:
Nmpv=Tsw/Tm
Tv=(the freshness interval)/Nv; and (h) providing Nmpv, Tv and Nv to a search routine.

2. The method of claim 1 wherein the search routine comprises:

measuring a plurality of first M pilots in the candidate frequencies search;

updating a data record which includes the strengths of each of the M pilots just measured;

for each of the M pilots measured removing the pilot from the candidate frequencies search set and putting the pilot in a C (acceptable) set, NC (not acceptable), or at the end of candidate frequencies search set based on the Time_of_Measures or measured Ec/Io of each pilot, where Time_of_Measures is the time available for measurements within the freshness interval.

* * * * *